(12) United States Patent
Ueda et al.

(10) Patent No.: US 10,589,579 B2
(45) Date of Patent: Mar. 17, 2020

(54) TIRE HOLDING DEVICE, TIRE TEST SYSTEM PROVIDED WITH SAME, AND CONTROL METHOD FOR TIRE HOLDING DEVICE

(71) Applicant: MITSUBISHI HEAVY INDUSTRIES MACHINERY SYSTEMS, LTD., Kobe-shi, Hyogo (JP)

(72) Inventors: Tatsuya Ueda, Hiroshima (JP); Makoto Tachibana, Hiroshima (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 147 days.

(21) Appl. No.: 16/065,553

(22) PCT Filed: Jun. 6, 2017

(86) PCT No.: PCT/JP2017/020982
§ 371 (c)(1),
(2) Date: Jun. 22, 2018

(87) PCT Pub. No.: WO2018/225154
PCT Pub. Date: Dec. 13, 2018

(65) Prior Publication Data
US 2019/0359017 A1 Nov. 28, 2019

(51) Int. Cl.
*B60C 25/05* (2006.01)
*B60C 25/138* (2006.01)
*G01M 17/02* (2006.01)

(52) U.S. Cl.
CPC ........ *B60C 25/0509* (2013.01); *B60C 25/138* (2013.01); *G01M 17/02* (2013.01)

(58) Field of Classification Search
CPC ..... B60C 25/0509; B60C 25/138; G01M 7/02
See application file for complete search history.

(56) References Cited

U.S. PATENT DOCUMENTS 5,992,227 A * 11/1999 Jellison ............... G01M 17/021
73/146
7,044,188 B2 * 5/2006 Pellerin ................. B60C 25/138
157/1.17

(Continued)

FOREIGN PATENT DOCUMENTS

| JP | H01-283131 A | 11/1989 |
| JP | H08-062101 A | 3/1996 |

(Continued)

OTHER PUBLICATIONS

PCT/ISA/210, "International Search Report for International Application No. PCT/JP2017/020982," dated Aug. 15, 2017.

(Continued)

*Primary Examiner* — David B. Thomas
(74) *Attorney, Agent, or Firm* — Manabu Kanesaka; Kenneth Berner; Benjamin Hauptman

(57) ABSTRACT

In a tire removal processing, a clamping step and a tire removing step are executed. In the clamping step, a tire is clamped by an upper support and a lower support by bringing the lower support into contact with a lower side wall of the tire in a state where a lower rim is fitted in the tire and the upper support is in contact with an upper side wall of the tire. In the tire removing step, the tire is detached from the lower rim by relatively moving the lower rim vertically downward with respect to a lower support while the clamping step is maintained.

13 Claims, 14 Drawing Sheets

(56) References Cited

U.S. PATENT DOCUMENTS

| | | | |
|---|---|---|---|
| 7,240,543 B2* | 7/2007 | Cargould | G01M 17/021 73/146 |
| 7,584,775 B2* | 9/2009 | Nomura | B60C 25/138 157/1.17 |
| 8,191,600 B2* | 6/2012 | Lawson | B60C 25/0515 157/1.1 |
| 8,408,272 B2* | 4/2013 | Lawson | B60C 25/0515 157/1.1 |
| 8,950,250 B2* | 2/2015 | Wakazono | B65G 37/00 73/146 |
| 9,429,498 B2* | 8/2016 | Vernyi | G01M 17/021 |
| 9,746,396 B2* | 8/2017 | Seimoto | B29D 30/0016 |
| 2005/0188755 A1 | 9/2005 | Cargould et al. | |
| 2008/0128091 A1* | 6/2008 | Nomura | B60C 25/138 157/1.17 |
| 2008/0289772 A1* | 11/2008 | Reeves, Jr. | B60C 25/138 157/1.1 |
| 2015/0165844 A1* | 6/2015 | Lawson | B60C 25/0515 157/1.22 |
| 2015/0360526 A1* | 12/2015 | Ishikawa | B60C 25/12 157/1.22 |
| 2015/0362406 A1 | 12/2015 | Seimoto et al. | |

FOREIGN PATENT DOCUMENTS

| | | |
|---|---|---|
| JP | 2015-197368 A | 11/2015 |
| JP | 5955476 B1 | 7/2016 |
| JP | 2016-148672 A | 8/2016 |
| JP | 6005276 B2 | 12/2016 |
| WO | 2014/199508 A1 | 12/2014 |

OTHER PUBLICATIONS

PCT/ISA/237 "Written Opinion of the International Searching Authority for International Application No. PCT/JP2017/020982," dated Aug. 15, 2017.

* cited by examiner

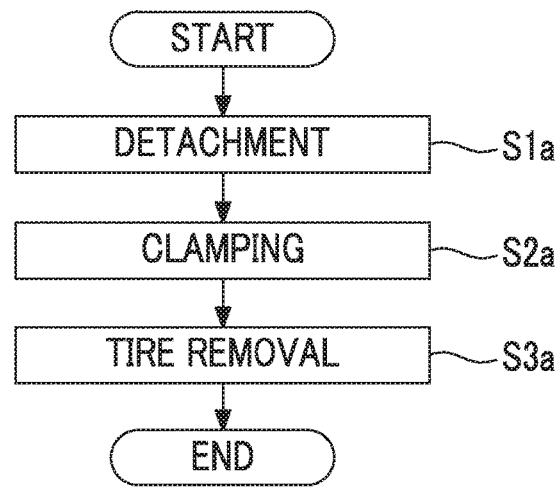
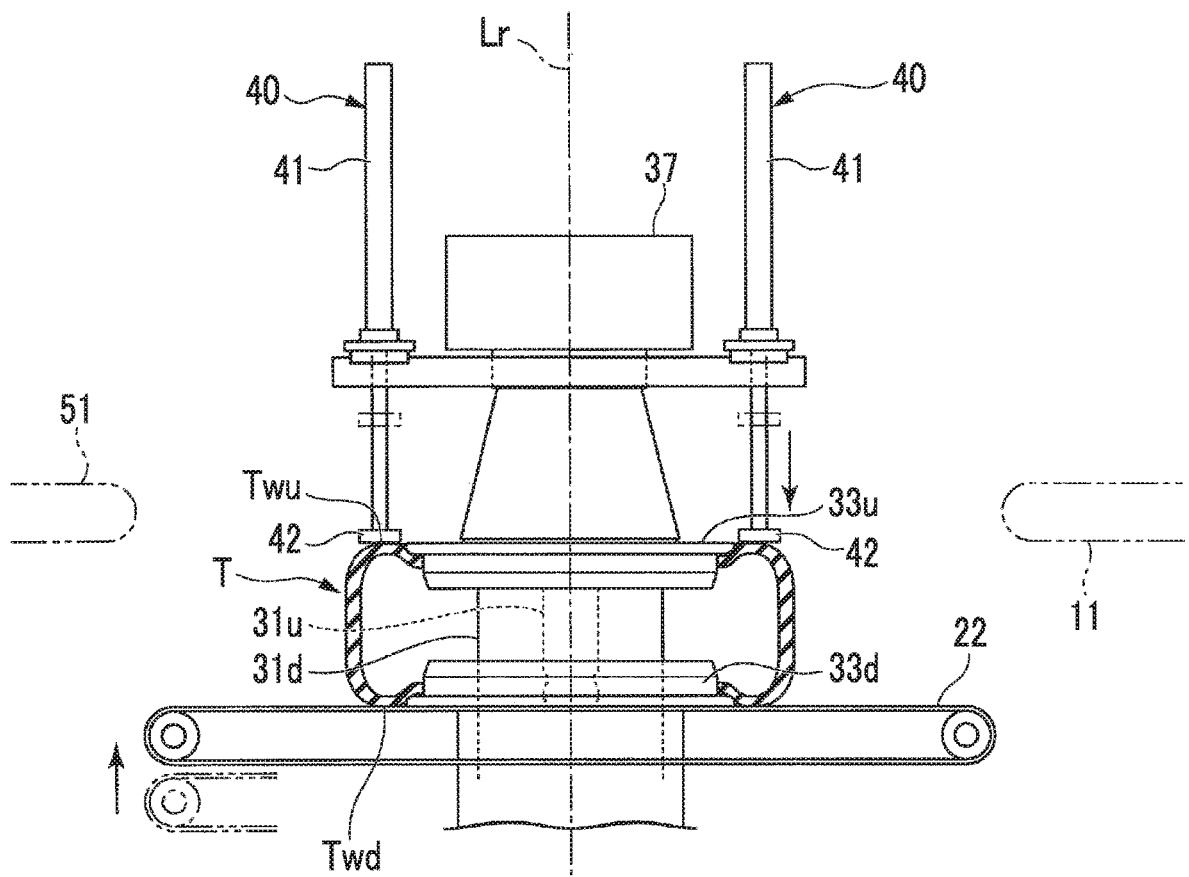

TIRE HOLDING DEVICE, TIRE TEST SYSTEM PROVIDED WITH SAME, AND CONTROL METHOD FOR TIRE HOLDING DEVICE

RELATED APPLICATIONS

The present application is National Phase of International Application No. PCT/JP2017/020982 filed Jun. 6, 2017, the disclosure of which is hereby incorporated by reference herein in its entirety.

TECHNICAL FIELD

The present invention relates to a tire holding device which holds a tire by clamping the tire from above and below by using an upper rim and lower rim, a tire test system which is provided with the tire holding device, and a control method for a tire holding device.

BACKGROUND ART

In a case of manufacturing a rubber tire which is used for a vehicle or the like, in order to guarantee the quality of the tire, various tests are performed on the tire in a state where the tire is pseudo-inflated (air-inflated) by a test device. In this type of tire test system, after a tire is conveyed to a test area by using a belt conveyor, the tire is held by clamping a bead portion of the tire by an upper rim and a lower rim disposed at the test area. Then, various tests are performed on the tire in a state where the tire is held. After various tests are performed, the tire is removed from the upper rim and the lower rim and conveyed toward the downstream side by the belt conveyor.

PTL 1 stated blow discloses a method of removing a tire from an upper rim and a lower rim after various tests on a tire are executed. In this method, the tire is first removed from the lower rim by integrally moving the upper rim and a belt conveyor vertically upward with respect to the lower rim in a state where the tire is clamped from above and below by the upper rim and the belt conveyor. If the tire is removed from the lower rim, the rise of the belt conveyor is stopped. On the other hand, the rise of the upper rim is continued. As a result, the tire fitted in the upper rim rises according to the rise of the upper rim and is separated from the belt conveyor. In the rise process of the tire, a tire stripper comes into contact with an upper side wall of the tire. The upper rim continues to rise even after that. If the upper rim relatively rises with respect to the tire stripper, the tire is removed from the upper rim.

CITATION LIST

Patent Literature

[PTL 1] Japanese Unexamined Patent Application Publication No. 2015-197368

SUMMARY OF INVENTION

Technical Problem

In the method described in PTL 1, when the tire is removed from the upper rim after the tire is removed from the lower rim, since the tire is separated from the belt conveyor, the tire falls at the moment the tire comes off from the upper rim. As a result, the tire bounds on the belt conveyor. If the tire bounds on the belt conveyor, there is a case where the tire falls from the belt conveyor, so that the tire cannot be conveyed by the belt conveyor. Further, even if the tire does not fall from the belt conveyor, if the tire does not fall to the intended position on the belt conveyor, there is also a case where a problem occurs in post-treatment after the conveyance by the belt conveyor.

Therefore, the present invention has an object to provide a tire holding device in which when a tire is removed from an upper rim or a lower rim, it is possible to suppress bounding of the tire and suppress the movement of the tire in a horizontal direction, a tire test system which is provided with the tire holding device, and a control method for the tire holding device.

Solution to Problem

According to a first aspect of the invention for achieving the above object, there is provided a tire holding device including: an upper rim which is fitted in an upper bead portion of a tire that is in a state where both side walls thereof face a vertical direction; a lower rim which is disposed below the upper rim and fitted in a lower bead portion of the tire to hold the tire along with the upper rim; an upper support capable of coming into contact with an upper side wall of the tire; a lower support which comes into contact with a lower side wall of the tire to support the tire; a lower support moving mechanism which relatively moves the lower support in the vertical direction with respect to the lower rim; and a controller which controls an operation of the lower support moving mechanism. The controller executes a clamping step of clamping the tire by the lower support and the upper support by bringing the lower support into contact with the lower side wall of the tire in a state where the upper rim is separated from the upper bead portion of the tire, the lower rim is fitted in the lower bead portion of the tire, and the upper support is in contact with the upper side wall of the tire, and a tire removing step of detaching the tire from the lower rim by relatively moving the lower rim vertically downward with respect to the lower support by driving the lower support moving mechanism while maintaining state where the tire is clamped by the lower support and the upper support.

In the tire holding device, in the tire removing step, the tire is detached from the lower rim in a state where the tire is clamped by the lower support and the upper support. For this reason, in the process of detaching the tire from the lower rim, it is possible to suppress bounding of the tire with respect to the lower support. Furthermore, in the tire holding device, the tire is detached from the lower rim in a state where the tire is clamped by the lower support and the upper support, and therefore, in the detaching process, it is also possible to prevent the tire from moving in the horizontal direction.

In a tire holding device according to a second aspect of the invention for achieving the above object, the tire holding device according to the first aspect further includes: a tire stripper which includes the upper support and an upper support moving mechanism which relatively moves the upper support in the vertical direction with respect to the upper rim. The controller executes, before at least the tire removing step, a detaching step of detaching the tire from the upper rim by bringing the upper support into contact with the upper side wall of the tire by relatively moving the upper support vertically downward with respect to the upper rim by driving the tire stripper in a state where the tire is held by the upper rim and the lower rim, and relatively moving the tire along with the upper support vertically downward with respect to the upper rim.

In the tire holding device, in the detaching step, the tire is detached from the upper rim in a state where the tire is clamped by the upper support and the lower rim. For this reason, it is possible to detach the tire from the upper rim in state where the tire is stable.

According to a third aspect of the invention for achieving the above object, there is provided a tire holding device including: an upper rim which is fitted in an upper bead portion of a tire that is in a state where both side walls thereof face a vertical direction; a lower rim which is disposed below the upper rim and fitted in a lower bead portion of the tire to hold the tire along with the upper rim; a rim elevating mechanism which relatively moves the upper rim in the vertical direction with respect to the lower rim; a lower support which comes into contact with a lower side wall of the tire to support the tire; a tire stripper which includes an upper support capable of coming into contact with an upper side wall of the tire, and an upper support moving mechanism which relatively moves the upper support in the vertical direction with respect to the upper rim; and a controller which controls an operation of each of the rim elevating mechanism and the tire stripper. The controller executes a clamping step of clamping the tire by the lower support and the upper support by bringing the upper support into contact with the upper side wall of the tire by driving the tire stripper in a state where the lower rim is separated from the lower bead portion of the tire, the upper rim is fitted in the upper bead portion of the tire, and the lower support is in contact with the lower side wall of the tire, and a tire removing step of detaching the tire from the upper rim by relatively moving the upper rim vertically upward with respect to the upper support by driving the rim elevating mechanism while maintaining a state where the tire is clamped by the lower support and the upper support.

In the tire holding device, in the tire removing step, the tire is detached from the upper rim in a state where the tire is clamped by the lower support and the upper support. For this reason, in the process of detaching the tire from the upper rim, it is possible to suppress bounding of the tire with respect to the lower support. Furthermore, in the tire holding device, the tire is detached from the upper rim in a state where the tire is clamped by the lower support and the upper support, and therefore, in the detaching process, it is also possible to prevent the tire from moving in the horizontal direction.

In a tire holding device according to a fourth aspect of the invention for achieving the above object, the tire holding device according to the third aspect further includes: a lower support moving mechanism which relatively moves the lower support in the vertical direction with respect to the lower rim. The controller executes, before at least the tire removing step, a detaching step of detaching the tire from the lower rim by bringing the lower support into contact with the lower side wall of the tire by relatively moving the lower support vertically upward with respect to the lower rim by driving the lower support moving mechanism in a state where the tire is held by the upper rim and the lower rim, and relatively moving the tire along with the lower support vertically upward with respect to the lower rim.

In the tire holding device, in the detaching step, the tire is detached from the lower rim in a state where the tire is clamped by the lower support and the upper rim. For this reason, it is possible to detach the tire from the lower rim in state where the tire is stable.

In a tire holding device according to a fifth aspect of the invention for achieving the above object, in the tire holding device according to any one of the second to fourth aspects, the upper support moving mechanism is an air cylinder. The air cylinder includes a piston rod extending in the vertical direction, and a cylinder case in which a first end of the piston rod is accommodated and which advances and retreats the piston rod with air pressure in the vertical direction. The upper support is fixed to a second end of the piston rod.

In the tire holding device, if air having an appropriate pressure is supplied into the cylinder case, it is possible to reliably press the tire, which is an elastic body, with the upper support. Accordingly, the air cylinder is used as the upper support moving mechanism, whereby control of the upper support moving mechanism becomes easy.

In a tire holding device according to a sixth aspect of the invention for achieving the above object, the tire holding device according to the fifth aspect further includes an air pressure regulator which regulates air pressure in the cylinder case. The controller makes the air pressure in the cylinder case during the clamping step lower than the air pressure in the cylinder case during the tire removing step by the air pressure regulator.

In the tire holding device, by regulating the pressure in the cylinder case, during the clamping step, it is possible to suppress large deformation of a part of the tire due to the upper support being strongly pressed against the tire.

In a tire holding device according to a seventh aspect of the invention for achieving the above object, in the tire holding device according to any one of the first to sixth aspects, both the upper rim and the lower rim are disposed to be centered on an axis extending in the vertical direction. The upper support includes a first upper support and a second upper support spaced apart from each other in a radial direction with respect to the axis. The lower support includes a first lower support and a second lower support spaced apart from each other in a radial direction with respect to the axis. Further, the tire holding device further includes an upper support distance changing mechanism which changes a distance between the first upper support and the second upper support in the radial direction, and a lower support distance changing mechanism which changes a distance between the first lower support and the second lower support in the radial direction.

In the tire holding device, even in a case where the tire size is changed, it is possible to bring the first upper support and the second upper support into contact with the upper side wall of the tire and bring the first lower support and the second lower support into contact with the lower side wall of the tire.

In a tire holding device according to an eighth aspect of the invention for achieving the above object, in the tire holding device according to any one of the first to seventh aspects, the lower support is a conveyor on which the tire that is in a state where both side walls thereof face the vertical direction is placed and which conveys the tire in a horizontal direction.

According to a ninth aspect of the invention for achieving the above object, there is provided a tire test system including: the tire holding device according to any one of the first to eighth aspects; and a tire measuring instrument which performs various measurements on the tire held by the upper rim and the lower rim.

A control method for a tire holding device according to a tenth aspect of the invention for achieving the above object is a control method for a tire holding device described below.

The tire holding device includes an upper rim which is fitted in an upper bead portion of a tire that is in a state where both side walls thereof face a vertical direction, a lower rim which is disposed below the upper rim and fitted in a lower bead portion of the tire to hold the tire along with the upper rim, an upper support capable of coming into contact with an upper side wall of the tire, a lower support which comes into contact with a lower side wall of the tire to support the tire, and a lower support moving mechanism which relatively moves the lower support in the vertical direction with respect to the lower rim.

In the control method, a clamping step of clamping the tire by the lower support and the upper support by bringing the lower support into contact with the lower side wall of the tire in a state where the upper rim is separated from the upper bead portion of the tire, the lower rim is fitted in the lower bead portion of the tire, and the upper support is in contact with the upper side wall of the tire, and a tire removing step of detaching the tire from the lower rim by relatively moving the lower rim vertically downward with respect to the lower support by driving the lower support moving mechanism while maintaining a state where the tire is clamped by the lower support and the upper support are executed.

In a control method for a tire holding device according to an eleventh aspect of the invention for achieving the above object, in the control method for a tire holding device according to the tenth aspect, the tire holding device further includes a tire stripper which includes the upper support and an upper support moving mechanism which relatively moves the upper support in the vertical direction with respect to the upper rim.

In the control method, a detaching step of detaching the tire from the upper rim by bringing the upper support into contact with the upper side wall of the tire by relatively moving the upper support vertically downward with respect to the upper rim by driving the tire stripper in a state where the tire is held by the upper rim and the lower rim, and relatively moving the tire along with the upper support vertically downward with respect to the upper rim is executed before at least the tire removing step.

A control method for a tire holding device according to a twelfth aspect of the invention for achieving the above object is a control method for a tire holding device described below.

The tire holding device includes an upper rim which is fitted in an upper bead portion of a tire that is in a state where both side walls thereof face a vertical direction, a lower rim which is disposed below the upper rim and fitted in a lower bead portion of the tire to hold the tire along with the upper rim, a rim elevating mechanism which relatively moves the upper rim in the vertical direction with respect to the lower rim, a lower support which comes into contact with a lower side wall of the tire to support the tire, and a tire stripper which includes an upper support capable of coming into contact with an upper side wall of the tire and an upper support moving mechanism which relatively moves the upper support in the vertical direction with respect to the upper rim.

In the control method, a clamping step of clamping the tire by the upper support and the lower support by bringing the upper support into contact with the upper side wall of the tire by driving the tire stripper in a state where the lower rim is separated from the lower bead portion of the tire, the upper rim is fitted in the upper bead portion of the tire, and the lower support is in contact with the lower side wall of the tire, and a tire removing step of detaching the tire from the upper rim by relatively moving the upper rim vertically upward with respect to the upper support by driving the rim elevating mechanism while maintaining a state where the tire is clamped by the lower support and the upper support are executed.

In a control method for a tire holding device according to a thirteenth aspect of the invention for achieving the above object, in the control method for a tire holding device according to the twelfth aspect, the tire holding device further includes a lower support moving mechanism which relatively moves the lower support in the vertical direction with respect to the lower rim.

In the control method, a detaching step of detaching the tire from the lower rim by bringing the lower support into contact with the lower side wall of the tire by relatively moving the lower support vertically upward with respect to the lower rim by driving the lower support moving mechanism in a state where the tire is held by the upper rim and the lower rim, and relatively moving the tire along with the lower support vertically upward with respect to the lower rim is executed before at least the tire removing step.

Advantageous Effects of Invention

According to an aspect of the present invention, when the tire is removed from the upper rim or the lower rim, it is possible to suppress the bounding of the tire and suppress the movement of the tire in the horizontal direction.

BRIEF DESCRIPTION OF DRAWINGS

FIG. 13 is a flowchart showing a procedure of a tire removing method in a second embodiment of the present invention.

FIG. 14 is an explanatory diagram (Part 1) showing a detaching step and a clamping step in the second embodiment of the present invention.

DESCRIPTION OF EMBODIMENTS

Hereinafter, various embodiments of a tire test system according to the present invention will be described with reference to the drawings.

First Embodiment

A first embodiment of the tire test system according to the present invention will be described with reference to FIGS. 1 to 12.

Figure 1:
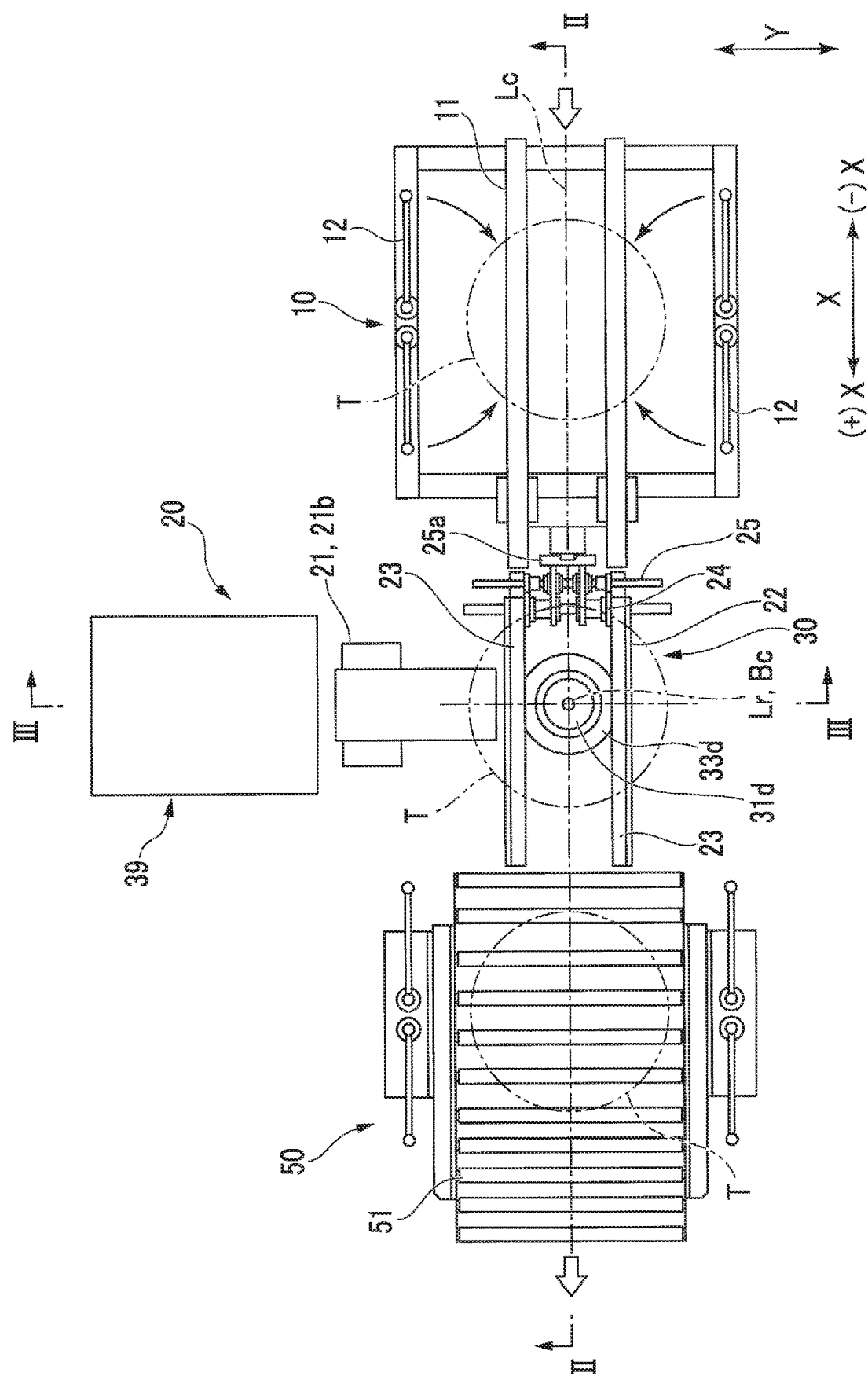
FIG. 1 is a plan view of a tire test system in a first embodiment of the present invention.
Figure 2:
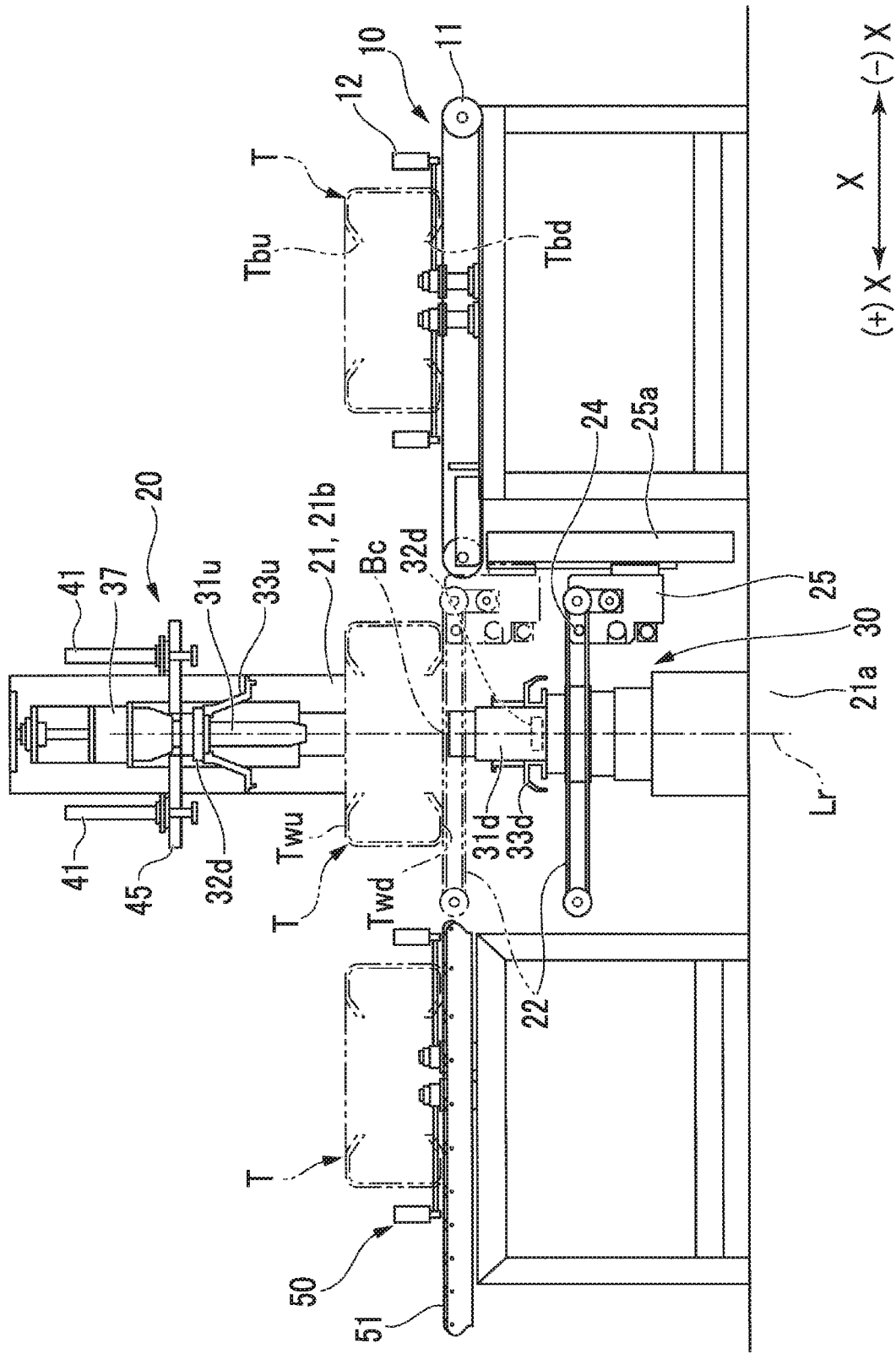
FIG. 2 is a sectional view taken along line II-II in FIG. 1.
Figure 3:
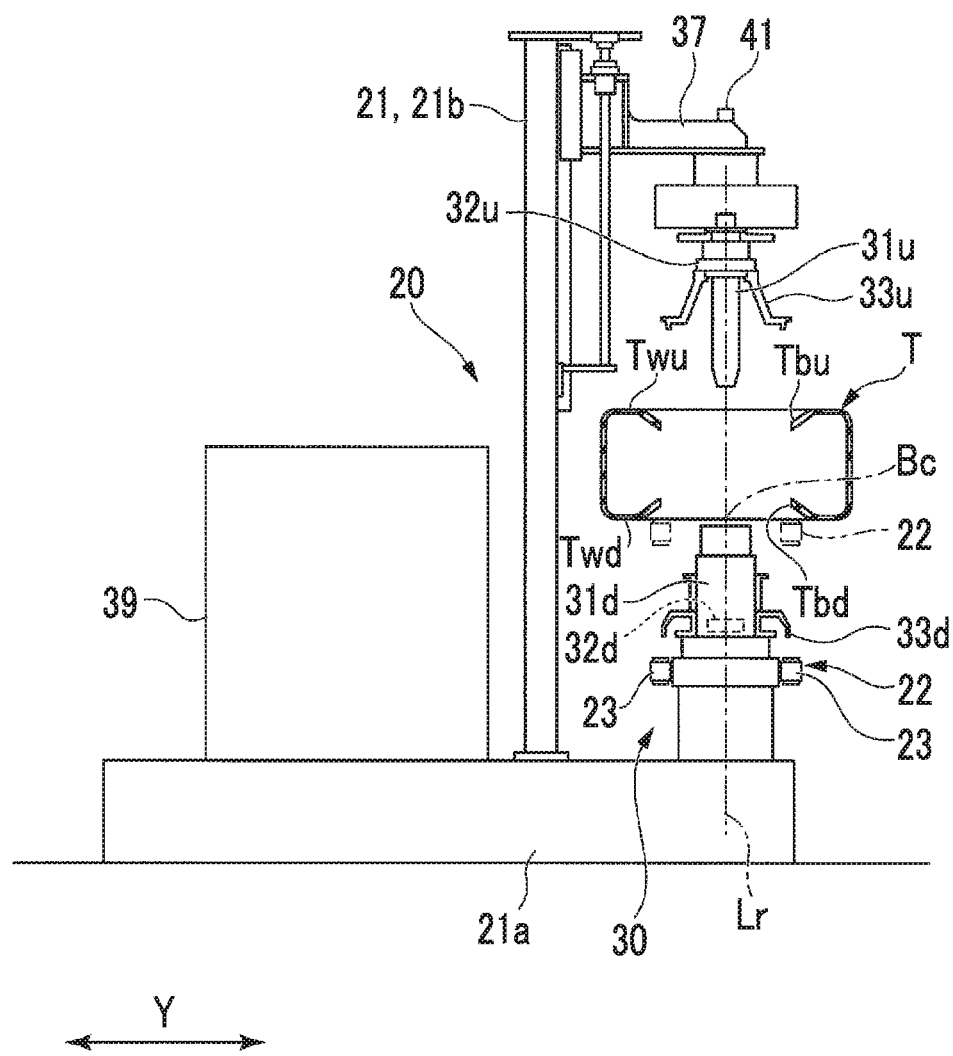
FIG. 3 is a sectional view taken along line III-III in FIG. 1.

As shown in FIGS. 1 to 3, the tire test system of this embodiment is provided with a pre-treatment device 10 which performs pre-treatment on a tire T that is a test object, a test device 20 which performs various tests on the tire T, a post-treatment device 50 which performs post-treatment on the tire T subjected to the test, and a controller 100 (refer to FIG. 6) which controls the operations of the devices 10, 20, and 50.

The pre-treatment device 10 is provided with an inlet conveyor 11, a centering mechanism 12, and a lubricant application mechanism (not shown). The inlet conveyor 11 conveys the tire T in a predetermined direction. Hereinafter, this direction is referred to as a tire conveying direction X. Further, one side in the tire conveying direction X is referred to as a downstream side (+)X, and the side opposite to the downstream side (+)X is referred to as an upstream side (−)X. The tire T that is in a state where both side walls Twu and Twd face a vertical direction is placed on the inlet conveyor 11. The inlet conveyor 11 conveys the tire T placed thereon from the upstream side (−)X to the downstream side (+)X.

The centering mechanism 12 positions the center of the tire T at a predetermined position of an inlet conveyance path on the inlet conveyor 11. The predetermined position is the center in a path width direction Y of the inlet conveyance path. Accordingly, the centering mechanism 12 centers the tire T. The lubricant application mechanism (not shown) applies a lubricant to an upper bead portion Tbu and a lower bead portion Tbd of the tire T which has been centered.

The test device 20 is provided with a tire holding device 30, a tire measuring instrument 39, and a frame 21 which supports the tire holding device 30 and the tire measuring instrument 39. The tire holding device 30 rotatably holds the tire T. The tire holding device 30 is provided with a center conveyor 22. The center conveyor 22 is disposed on the downstream side (+)X of the inlet conveyor 11 and conveys the tire T in the same direction as the tire conveying direction X of the inlet conveyor 11. Accordingly, the path width direction Y of a center conveyance path of the center conveyor 22 is also the same direction as the path width direction Y of the inlet conveyance path. The tire measuring instrument 39 performs various measurements relating to the tire T held by the tire holding device 30.

The post-treatment device 50 is provided with an outlet conveyor 51 and a marking mechanism (not shown). The outlet conveyor 51 is disposed on the downstream side (+)X of the center conveyor 22 and conveys the tire T in the same direction as the tire conveying direction X in the inlet conveyor 11 and the center conveyor 22. Accordingly, the path width direction Y of an outlet conveyance path of the outlet conveyor 51 is also the same direction as the path width direction Y in the inlet conveyance path and the center conveyance path. The level in the vertical direction of the outlet conveyance path is the same as the level in the vertical direction of the inlet conveyance path.

As shown in FIGS. 2 and 3, the tire holding device 30 in the test device 20 is provided with, in addition to the center conveyor 22 described above, an upper spindle 31u, an upper rim chuck mechanism 32u, a lower spindle 31d, a lower rim chuck mechanism 32d, a rim elevator 37, a conveyor elevating device 25, two tire strippers 40, and a stripper distance changing mechanism 45.

Each of the upper spindle 31u and the lower spindle 31d is a columnar member centered on an axis of rotation Lr extending in the vertical direction. The lower spindle 31d is rotationally driven around the axis of rotation Lr on a base 21a of the frame 21. The lower rim chuck mechanism 32d holds a lower rim 33d which is fitted in the lower bead portion Tbd of the tire T. The lower rim 33d is held by the lower rim chuck mechanism 32d, thereby entering a state of being mounted on the lower spindle 31d. The upper rim chuck mechanism 32u holds an upper rim 33u which is fitted in the upper bead portion Tbu of the tire T. The upper rim 33u is held by the upper rim chuck mechanism 32u, thereby entering a state of being mounted on the upper spindle 31u.

The tire stripper 40 and the stripper distance changing mechanism 45 will be described later.

The rim elevator (a rim elevating mechanism) 37 is supported on a main frame 21b of the frame 21 so as to be movable in the vertical direction. The upper spindle 31u described above is supported on the rim elevator 37.

The rim elevator 37 moves up and down in a state where the axis of rotation Lr of the upper spindle 31u coincides with the axis of rotation Lr of the lower spindle 31d. If the rim elevator 37 moves down, a lower portion of the upper spindle 31u is inserted into the lower spindle 31d. The upper spindle 31u is combined with the lower spindle 31d at a predetermined insertion position by a locking mechanism (not shown) provided in the lower spindle 31d. If the upper spindle 31u is combined with the lower spindle 31d by the locking mechanism, the upper spindle 31u rotates integrally with the lower spindle 31d according to the rotation of the lower spindle 31d.

The center conveyor 22 described above is supported on the main frame 21b through guide means 25a such as a linear guide so as to be movable in the vertical direction. The center conveyor 22 moves up and down in the vertical direction between an upper limit position and a lower limit position by the conveyor elevating device (a lower support moving mechanism) 25 having a servomotor (not shown). The upper limit position of the center conveyor 22 is a position at which the level of the upper surface of the center conveyor 22, in other words, the level of the center conveyance path, becomes the same level as the levels of the inlet conveyance path and the outlet conveyance path, as shown by an imaginary line in FIGS. 2 and 3. The lower limit position of the center conveyor 22 is a position at which the level of the upper surface of the center conveyor is lower than the lower rim 33d mounted on the lower spindle 31d, as shown by a solid line in FIGS. 2 and 3.

When the center conveyance path of the center conveyor 22 is positioned at the upper limit position, an imaginary line passing through the axis of rotation Lr of the upper spindle 31u and the lower spindle 31d and extending in the tire conveying direction X on the center conveyance path is a path center line Lc. The centering mechanism 12 of the pre-treatment device 10 positions the center of the tire T on the path center line Lc.

The center conveyor (a lower support) 22 has a pair of belts 23 separated from each other by a predetermined distance in the path width direction Y. The belt 23 on one side and the belt 23 on the other side of the pair of belts 23 are disposed at positions which are symmetrical in the path width direction Y with the path center line Lc passing through the axis of rotation Lr as the reference. The distance between both the belts in the path width direction Y in the pair of belts 23 can be adjusted by a belt distance changing mechanism (a lower support distance changing mechanism) 24 which is known. For this reason, the lower spindle 31$d$ and the lower rim 33$d$ can pass between the pair of belts 23 when the center conveyor 22 moves up and down.

Both the two tire strippers 40 described above relatively move the tire T fitted in the upper rim 33$u$ in the vertical direction with respect to the upper rim 33$u$, thereby removing the tire T from the upper rim 33$u$. The stripper distance changing mechanism (an upper support distance changing mechanism) 45 moves each of the two tire strippers 40 in a radial direction with respect to the axis of rotation Lr described above.

Figure 4:
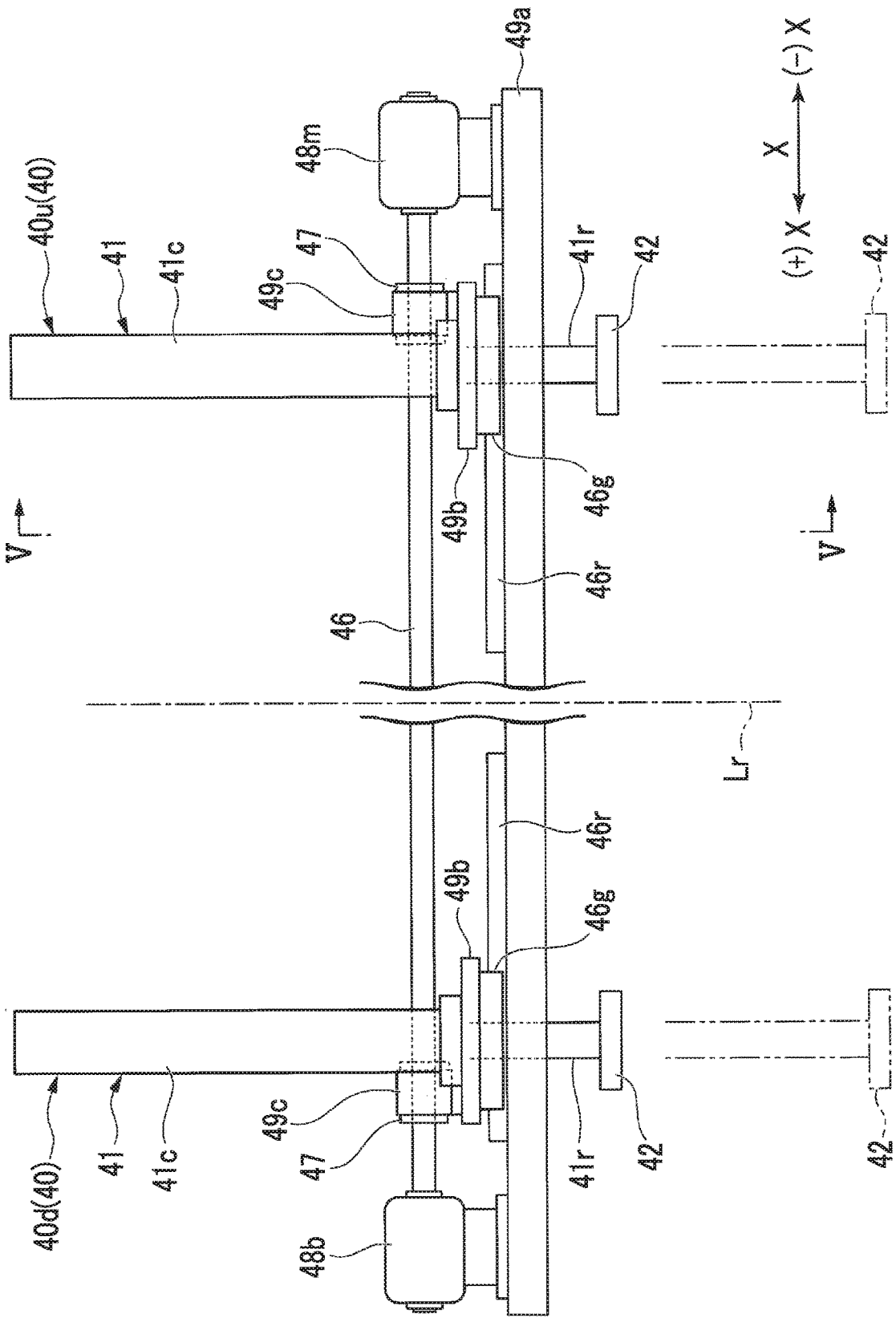
FIG. 4 is a front view of tire stripper and a stripper distance changing mechanism in the first embodiment of the present invention.
Figure 5:
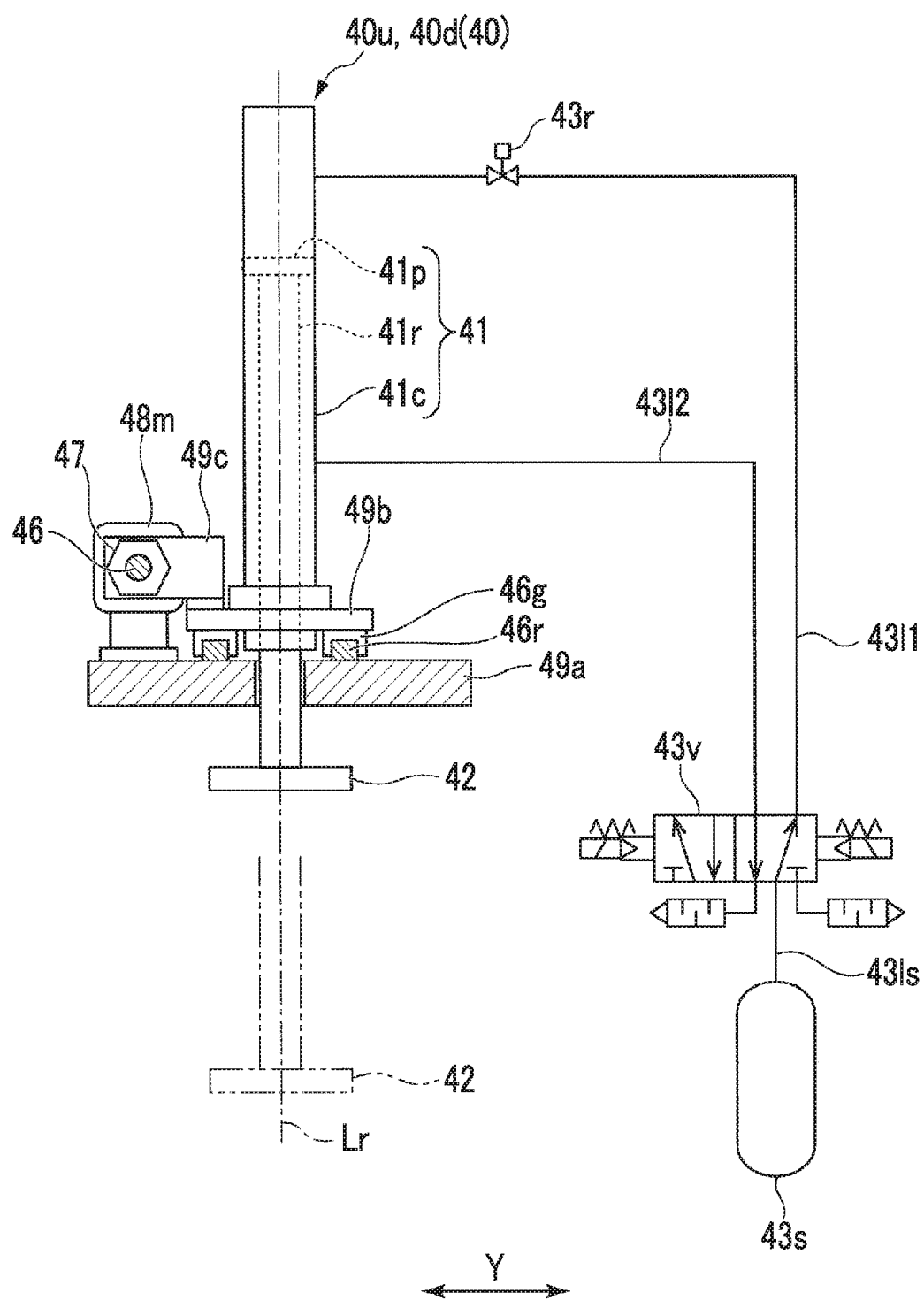
FIG. 5 is a sectional view taken along line V-V in FIG. 4.

The tire stripper 40 has a pressing plate (an upper support) 42 and a pressing plate moving mechanism (an upper support moving mechanism) 41, as shown in FIGS. 4 and 5. In this embodiment, the pressing plate moving mechanism 41 is an air cylinder. The pressing plate moving mechanism 41 has a cylinder case 41$c$, a piston rod 41$r$, and a piston 41$p$. The piston 41$p$ is fixed to a base end of the piston rod 41$r$. The base end of the piston rod 41$r$ and the piston 41$p$ are contained in the cylinder case 41$c$. The pressing plate 42 having a plate shape is fixed to the tip of the piston rod 41$r$. The tip of the piston rod 41$r$ and the pressing plate 42 are exposed from the cylinder case 41$c$. The inside of the cylinder case 41$c$ is partitioned into a first chamber and a second chamber by the piston 41$p$. A first air line 4311 communicating with the first chamber and a second air line 4312 communicating with the second chamber are connected to the cylinder case 41$c$. An air pressure regulator 43$r$ is provided in the first air line 4311. The first air line 4311 is connected to a first port of switching valve 43$v$ and the second air line 4312 is connected to a second port of the switching valve 43$v$. An air supply line 431$s$ extending from an air supply source 43$s$ is connected to a third port of the switching valve 43$v$. In this embodiment, the pressure in the cylinder case 41$c$ is adjusted to a predetermined pressure by the air pressure regulator 43$r$. If air having a predetermined pressure is supplied from the air supply source 43$s$ to the cylinder case 41$c$ through the air supply line 431$s$, the switching valve 43$v$, and the first air line 4311, the piston rod 41$r$ and the pressing plate 42 move together with the piston. 41$p$. The pressing plate 42 comes into contact with the upper side wall of the tire T fitted in the upper rim 33$u$ and pushes the tire T vertically downward.

The stripper distance changing mechanism 45 has a screw shaft 46, a rail 46$r$, a guide 46$g$, a nut member 47, a bearing 48$b$, a motor 48$m$, a distance changing mechanism base 49$a$, and a cylinder mounting plate 49$b$. Both the screw shaft 46 and the rail 46$r$ extend in a horizontal direction perpendicular to the axis of rotation Lr of the upper spindle 31$u$ and the lower spindle 31$d$. In this embodiment, both the screw shaft 46 and the rail 46$r$ extend in the tire conveying direction X which is a horizontal direction. A female screw is formed in the nut member 47. The nut member is screwed onto the screw shaft 46. The bearing 48$b$ supports the screw shaft 46 such that the screw shaft 46 can rotate around the central axis thereof. The motor 48$m$ rotates the screw shaft 46 around the central axis. Both the motor 48$m$ and the bearing 48$b$ are fixed to the distance changing mechanism base 49$a$. The distance changing mechanism base 49$a$ is fixed to the rim elevator 37 described above. The cylinder mounting plate 49$b$ faces the distance changing mechanism base 49$a$ while being spaced apart from the distance changing mechanism base 49$a$ in the vertical direction. The cylinder case 41$c$ of the tire stripper 40 is fixed to the cylinder mounting plate 49$b$ such that the piston rod 41$r$ of the tire stripper 40 advances and retreats in the vertical direction. The cylinder mounting plate 49$b$ is connected to the nut member 47 by a nut bracket 49$c$. The rail 46$r$ and the guide 46$g$ are disposed between the cylinder mounting plate 49$b$ and the distance changing mechanism base 49$a$. The rail 46$r$ is fixed to the distance changing mechanism base 49$a$. The guide 46$g$ is mounted on the rail 46$r$ so as to be slidable with respect to the rail 46$r$, The guide 46$g$ is fixed to the cylinder mounting plate 49$b$.

With the configuration described above, if the motor 48$m$ is driven, so that the screw shaft 46 rotates around the central axis thereof, the nut member 47 and the tire stripper 40 connected to the nut member 47 move in the horizontal direction.

In this embodiment, the piston rods 43 of the two tire strippers 40 are positioned above the path center line Lc described above. Further, the two tire strippers 40 are disposed at the positions which are symmetrical in the conveying direction X with the axis of rotation Lr of the upper spindle 31$u$ and the lower spindle 31$d$ as the reference. The female screw of the nut member 47 connected to a first tire stripper 40$u$ out of the two tire strippers 40 is a reverse screw with respect to the female screw of the nut member 47 connected to a second tire stripper 40$d$. For this reason, if the screw shaft 46 rotates so that the first tire stripper 40$u$ moves in a direction away from the axis of rotation Lr of the upper spindle 31$u$ and the lower spindle 31$d$, the second tire stripper 40$d$ also moves in a direction away from the axis of rotation Lr. Conversely, if the screw shaft 46 rotates so that the first tire stripper 40$u$ moves in a direction approaching the axis of rotation Lr, the second tire stripper 40$d$ also moves in a direction approaching the axis of rotation Lr. As described above, the two tire strippers 40 move, whereby the side wall of each of the tires T having different outer diameters can be pushed with the two tire strippers 40.

Figure 6:
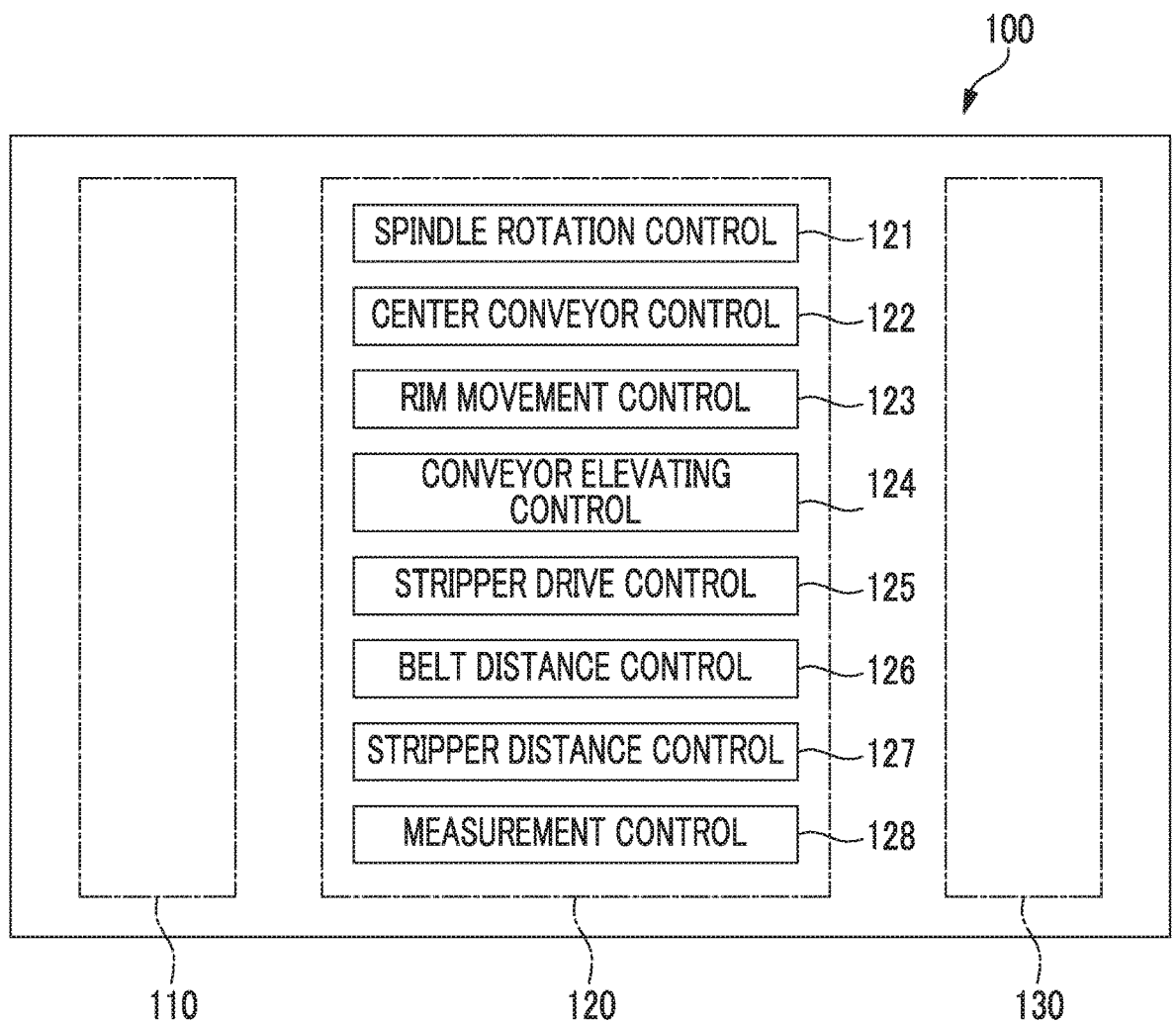
FIG. 6 is a functional block diagram of a controller in the first embodiment of the present invention.

The controller 100 controls the operations of the pre-treatment device 10, the test device 20, and the post-treatment device 50, as described above. As shown in FIG. 6, the controller 100 has a pre-treatment control unit 110 which controls the operation of the pre-treatment device 10, a test control unit 120 which controls the operation of the test device 20, and a post-treatment control unit 130 which controls the operation of the post-treatment device 50. The test control unit 120 has a spindle rotation control unit 121 which controls the operation of a servomotor 35 for rotating the lower spindle 31$d$, a center conveyor control unit 122 which controls the operation of the center conveyor 22, a rim movement control unit 123 which controls the operation of the rim elevator 37, a conveyor elevating control unit 124 which controls the operation of the conveyor elevating device 25, a stripper drive control unit 125 which controls the operation of the tire stripper 40, a belt distance control unit 126 which controls the operation of the belt distance changing mechanism 24, and a stripper distance control unit 127 which controls the operation of the stripper distance changing mechanism 45.

Next, the operation of the tire test system described above will be described. If the tire T is placed on the inlet conveyor 11, the centering mechanism 12 of the pre-treatment device 10 operates to position the center of the tire T on the center of the inlet conveyance path, in other words, on the path center line Lc. After the centering mechanism 12 is operated, the lubricant application mechanism of the pre-treatment device 10 applies a lubricant to the upper bead portion Tbu and the lower bead portion Tbd of the tire T.

Figure 8:
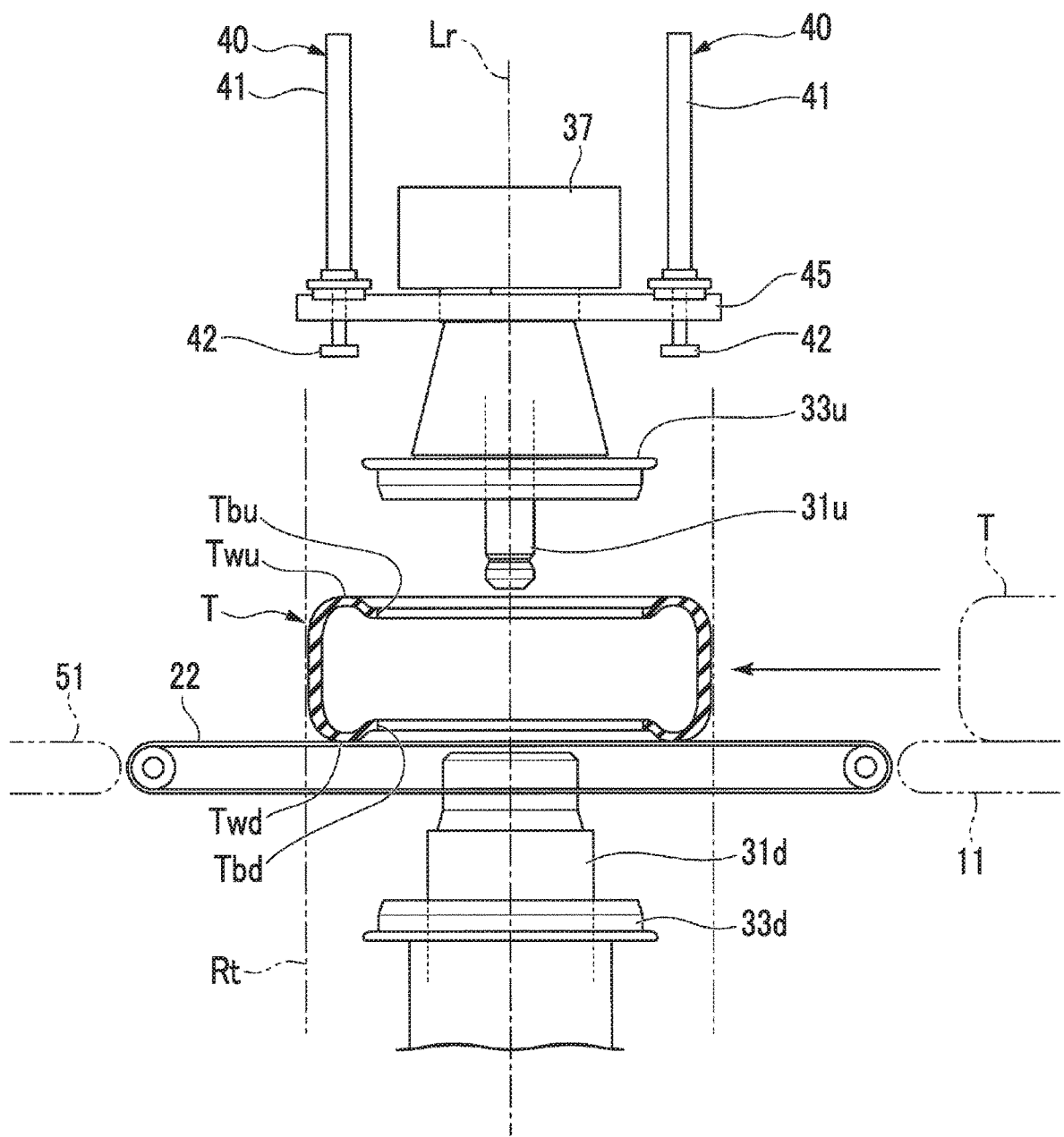
FIG. 8 is an explanatory diagram showing the state when a tire has been conveyed into a test area by a center conveyor in the first embodiment of the present invention.

If the application of the lubricant to the tire T is ended, the inlet conveyor 11 and the center conveyor 22 start to be driven, and convey the tire T toward the downstream side (+)X. The center conveyor control unit 122 of the controller 100 determines whether or not the tire T has been conveyed into a test area Rt shown in FIG. 8, from the driving amount of the center conveyor 22, the driving time of the center conveyor 22, or the like. The test area Rt is a columnar area having an outer diameter substantially equal to the outer diameter of the tire T and centered on the axis of rotation Lr. If the center conveyor control unit 122 determines that the tire T has been conveyed into the test area Rt, as shown in FIG. 8, the center conveyor control unit 122 stops the center conveyor 22. The center conveyor control unit 122 may control the driving amount of the center conveyor 22, based on a signal from a position sensor which detects the position of the tire T.

Figure 9:
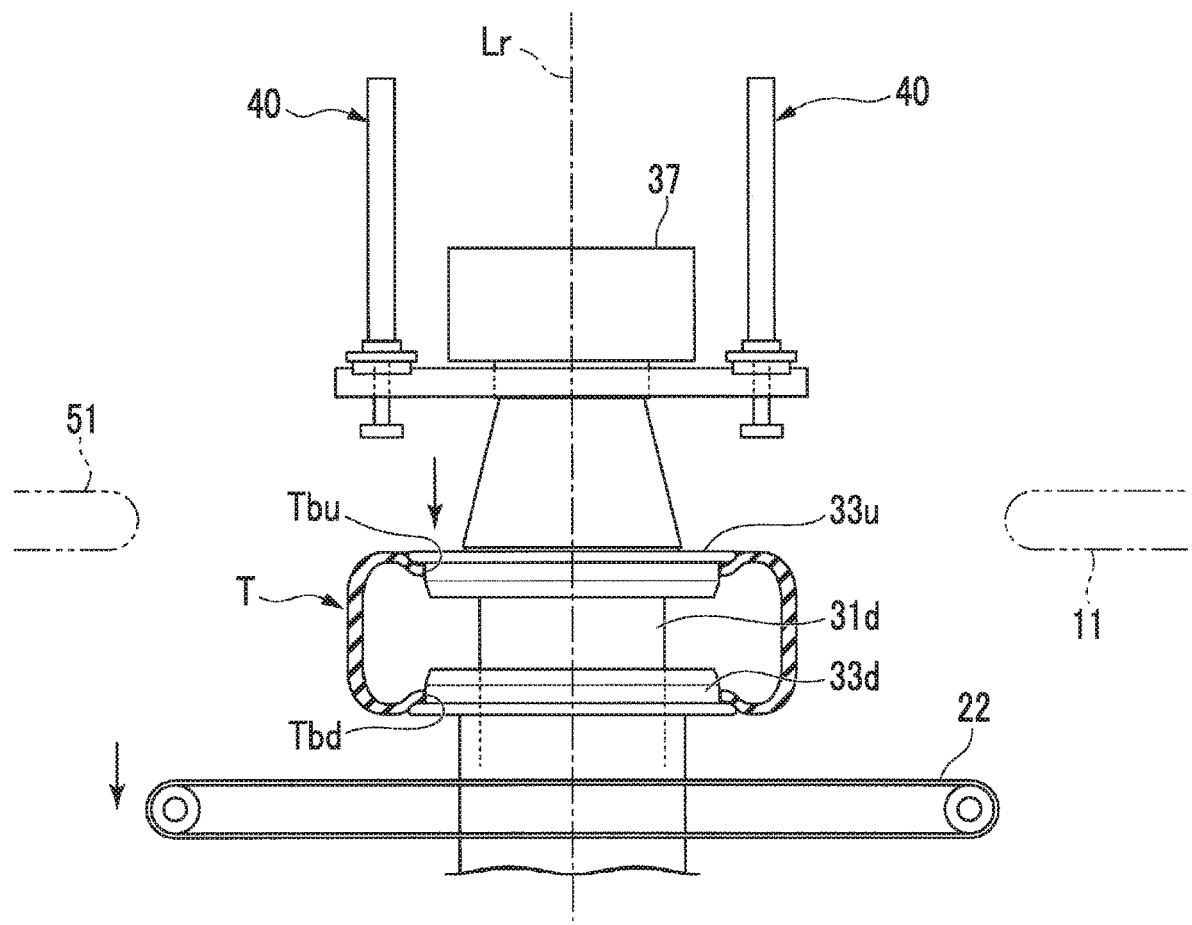
FIG. 9 is an explanatory diagram showing a step of fitting an upper rim and a lower rim into the tire in the first embodiment of the present invention.

If the center conveyor 22 stops, the conveyor elevating control unit 124 drives the conveyor elevating device 25 to lower the center conveyor 22 and the tire T placed on the center conveyor 22, as shown in FIG. 9, and drives the rim elevator 37 to lower the upper spindle 31u and the upper rim 33u. The rim movement control unit 123 controls the driving of the rim elevator 37 such that the lowering speed of the upper spindle 31u and the upper rim 33u becomes equal to or substantially equal to the lowering speed of the center conveyor 22. In this lowering process, the upper rim 33 us is fitted in the upper bead portion Tbu of the tire T and the lower rim 33d mounted on the lower spindle 31d is fitted in the lower bead portion Tbd of the tire T. As a result, the tire T is clamped by the upper rim 33u and the lower rim 33d. Further, the lower portion of the upper spindle 31u enters the lower spindle 31d. The upper spindle 31u is combined with the lower spindle 31d by the locking mechanism (not shown) provided in the lower spindle 31d. At this step, the center conveyor 22 is separated downward from the tire T.

Thereafter, air is supplied from the outside to the inside of the tire T through the upper spindle 31u or the lower spindle 31d. If air is supplied to the inside of the tire T, the spindle rotation control unit 121 rotates the lower spindle 31d. With the rotation of the lower spindle 31d, the lower rim 33d mounted on the lower spindle 31d, the upper spindle 31u combined with the lower spindle 31d, and the upper rim 33u mounted on the upper spindle 31u rotate integrally with the lower spindle 31d. As a result, the tire T clamped by the upper rim 33u and the lower rim 33d also rotates. During the rotation of the tire T, a measurement control unit 128 executes various measurements relating to the tire T.

If the various measurements are ended, air is exhausted from the tire T. Further, the combined state between the upper spindle 31u and the lower spindle 31d by the locking mechanism is released.

If various measurements relating to the tire T are ended and the combined state between the upper spindle 31u and the lower spindle 31d is released, tire removal processing of removing the tire T from the upper spindle 31u and the lower spindle 31d is executed.

Figure 7:
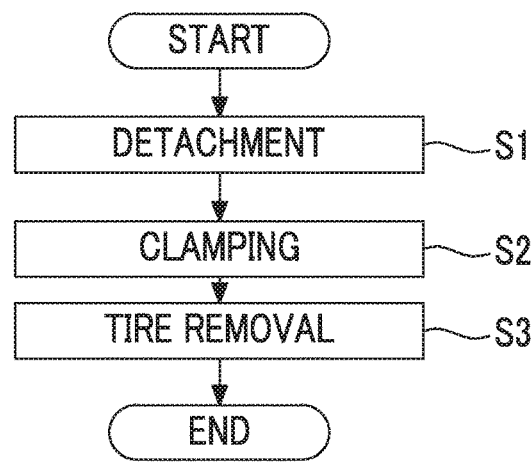
FIG. 7 is a flowchart showing a procedure of a tire removing method in the first embodiment of the present invention.

The tire removal processing will be described according to the flowchart shown in FIG. 7.

Figure 10:
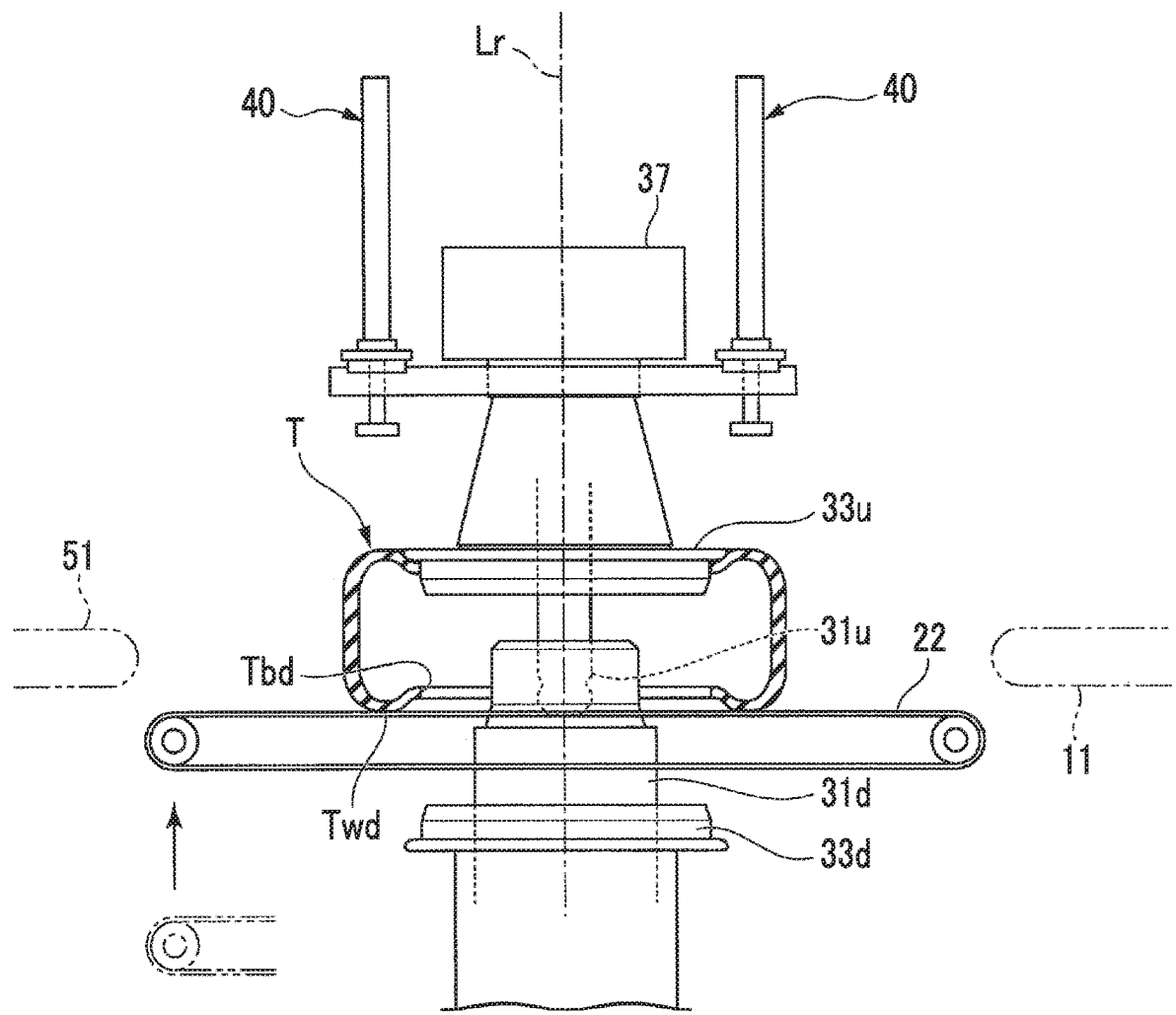
FIG. 10 is an explanatory diagram showing a detaching step in the first embodiment of the present invention.

First, a detaching step (S1) of detaching the tire T from the lower rim 33d is executed. Before the execution of the detaching step (S1), the tire T is held by the upper rim (a first rim) 33u and the lower rim (a second rim) 33d, as shown in FIG. 9. In the detaching step (S1), as shown in FIG. 10, first, the convey elevating control unit 124 drives the conveyor elevating device (the lower support moving mechanism, a second moving mechanism) 25 to raise the center conveyor (a second support) 22 so as to bring the upper surface of the center conveyor 22 into contact with the lower side wall Twd of the tire T. Alternatively, the tire T is supported by the center conveyor 22. Thereafter, the conveyor elevating control unit 124 continues to drive the conveyor elevating device 25 to raise the center conveyor 22, and the rim movement control unit 123 drives the rim elevator 37 to raise the upper spindle 31u and the upper rim 33u along with the rim elevator 37. The rim movement control unit 123 controls the driving of the rim elevator 37 such that the rising speeds of the upper spindle 31u and the upper rim 33u become equal or substantially equal to the rising speed of the center conveyor 22. Accordingly, the tire T rises in a state of being clamped by the center conveyor 22 and the upper rim 33u. Due to the rise of the tire T, the lower rim 33d comes out from the lower bead portion Tbd of the tire T. That is, the tire T is detached from the lower rim (the second rim) 33d. As described above, in this embodiment, the tire T is detached from the lower rim (the second rim) 33d in a state where the tire T is clamped by the center conveyor (the lower support, the second support) 22 and the upper rim (the first rim) 33u. Accordingly, in this embodiment, the tire T can be detached from the lower rim (the second rim) 33d in a state where the tire T is stable.

At the point in time when the detaching step (S1) is completed, the upper rim (the first rim) 33u is still fitted in the upper bead portion Tbu of the tire T, and the center conveyor (the lower support, the second support) 22 is in a state of being in contact with the lower side wall Twd of the tire T.

Figure 11:
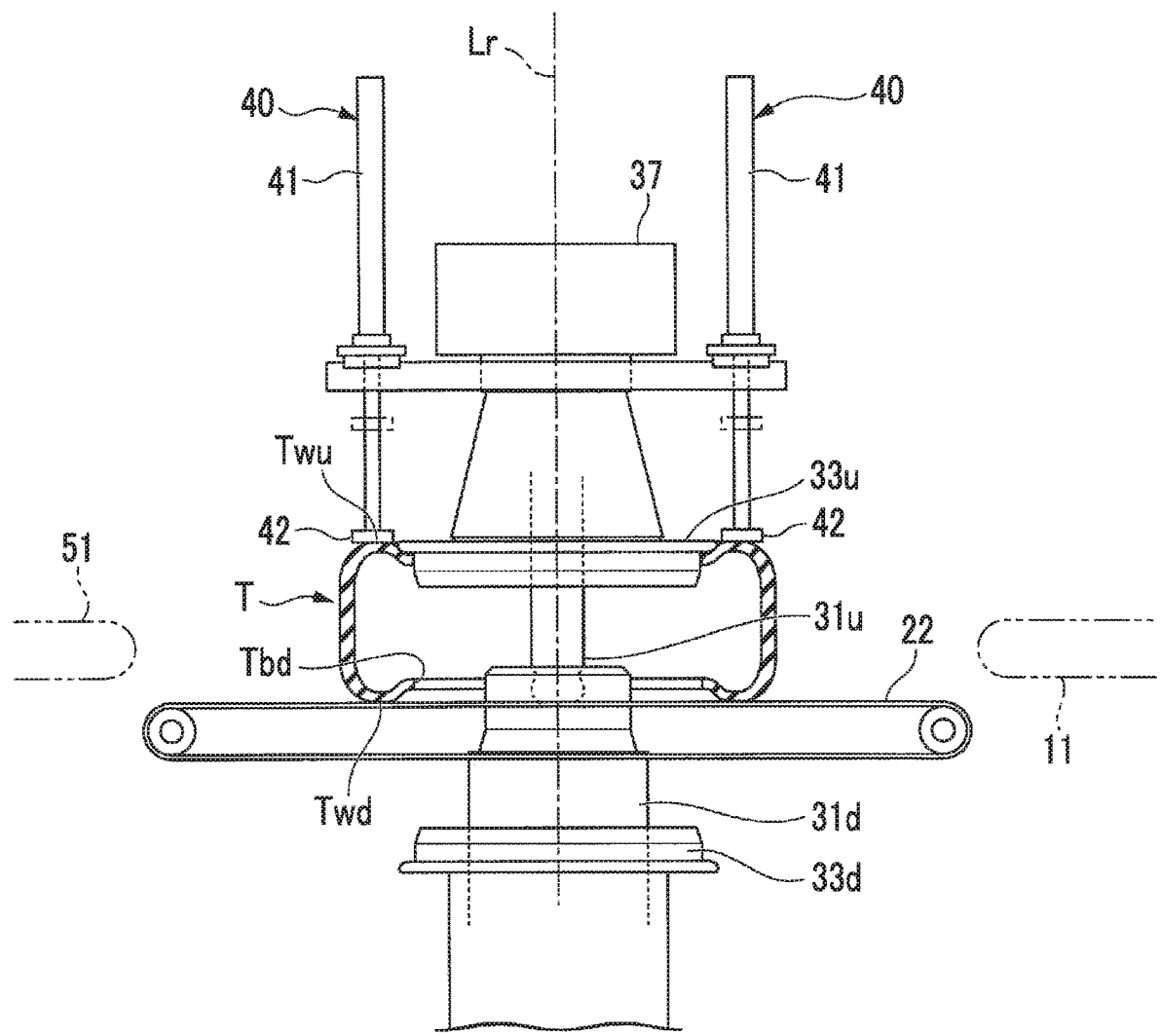
FIG. 11 is an explanatory diagram showing a clamping step in the first embodiment of the present invention.

If the detaching step (S1) is completed, as shown in FIG. 11, a clamping step (S2) of clamping the tire T by the pressing plate (the upper support, a first support) 42 and the center conveyor (the lower support, the second support) 22 is executed. In the clamping step (S2), the stripper drive control unit 125 drives the pressing plate moving mechanism (the upper support moving mechanism, a first moving mechanism) 41 to lower the pressing plate (the upper support, the first support) 42 of the tire stripper 40 so as to bring the pressing plate 42 into contact with the upper side wall Twu of the tire T. As a result, the tire T enters a state of being clamped by the pressing plate 42 and the center conveyor 22 from the vertical direction.

Figure 12:
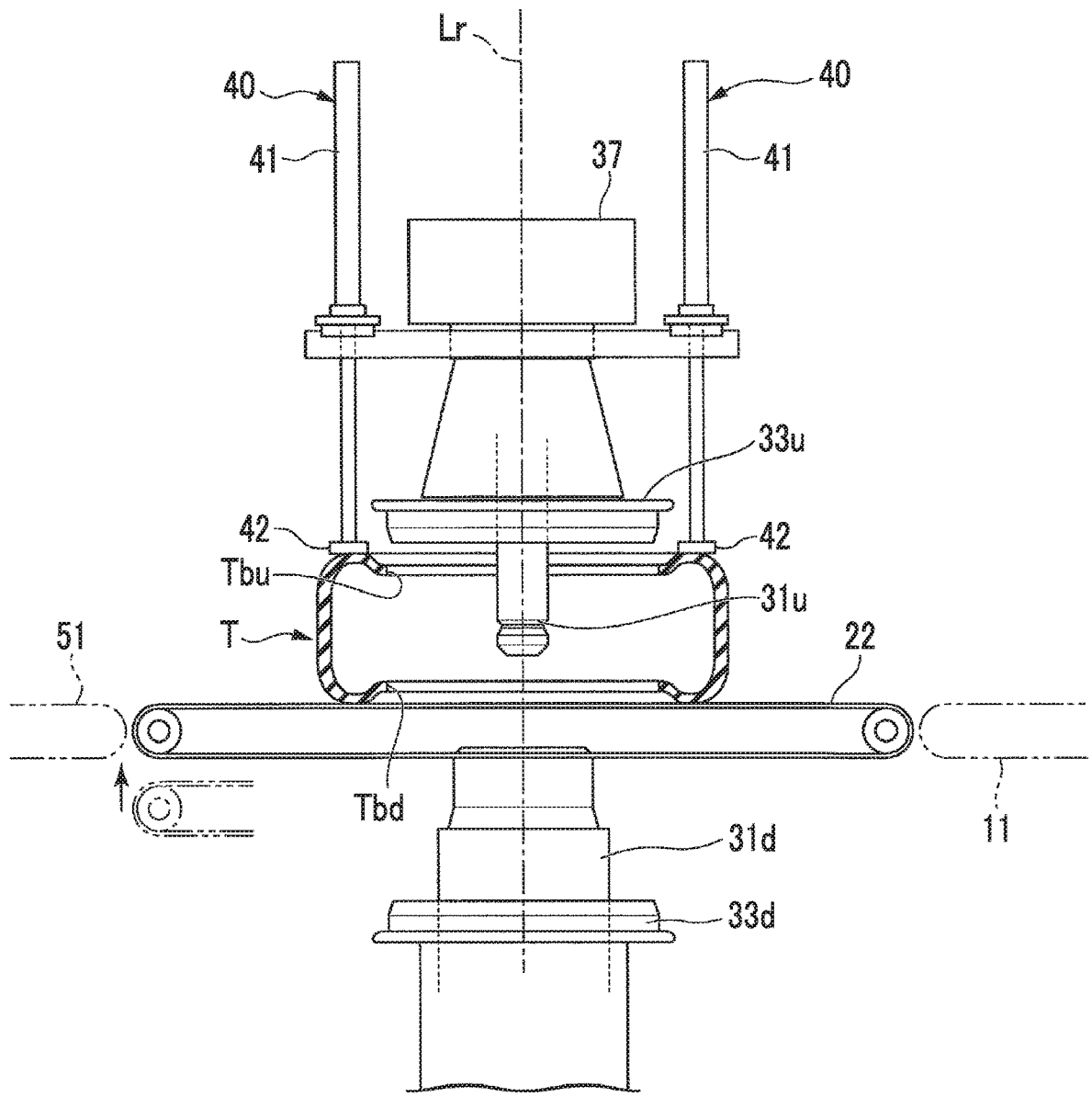
FIG. 12 is an explanatory diagram showing a tire removing step in the first embodiment of the present invention.

Next, as shown in FIG. 12, a tire removing step (S3) of detaching the tire T from the upper rim 33u by relatively moving the upper rim (the first rim) 33u vertically upward with respect to the pressing plate (the upper support member, the first support member) 42 while maintaining a state where the tire T is clamped by the pressing plate (the upper support) 42 and the center conveyor (the lower support) 22 is executed. In the tire removing step (S3), the conveyor elevating control unit 124 drives the conveyor elevating device 25 to raise the center conveyor 22, and the rim movement control unit 123 drives the rim elevator 37 to raise the upper spindle 31*u* and the upper rim 33*u* along with the rim elevator 37. If the center conveyor 22 reaches the upper limit position, the conveyor elevating control unit 124 stops the conveyor elevating device 25. On the other hand, even after that, the rim movement control unit 123 drives the rim elevator 7 to raise the upper spindle 31*u* and the upper rim 33*u* along with the rim elevator 37. Accordingly, the distance between the center conveyor 22 and the upper rim 33*u* in the vertical direction is increased after the center conveyor 22 stops at the upper limit position. While the distance between the center conveyor and the upper rim 33*u* in the vertical direction is increased, the pressing plate 42 maintains a state of pressing the tire T downward. For this reason, the upper rim (the first rim) 33*u* relatively moves vertically upward with respect to the pressing plate (the upper support, the first support) 42. Due to the rise of the upper rim 33*u*, the upper rim 33*u* comes out from the upper bead portion Tbu of the tire T. That is, the tire T is detached from the upper rim (the first rim) 33*u*. With the above, the tire removing step (S3) is completed.

With the completion of the tire removing step (S3), the tire removal processing of removing the tire T from the upper spindle 31*u* and the lower spindle 31*d* is ended.

If the tire removal processing is ended, the center conveyor 22 is driven to convey the tire T on the center conveyor 22 toward the downstream side (+)X. As described above, the upper limit position of the center conveyor 22 is a position at which the level of the center conveyance path Pc is the same level as the levels of the inlet conveyance path and the outlet conveyance path. For this reason, the tire T on the center conveyor 22 is transferred from the center conveyor 22 to the outlet conveyor 51. Various types of information such as measurement results are marked on the tire T on the outlet conveyor 51 by a marking mechanism (not shown).

With the above, the operation of the tire test system is completed.

As described above, in this embodiment, in a state where the tire T is clamped by the center conveyor 22 and the pressing plate 42, the tire T is detached from the upper rim 33*u* (S3: tire removing step). For this reason, in the process of detaching the tire T from the upper rim 33*u*, the tire T temporarily rises integrally with the upper rim 33*u*, and thus it is possible to prevent the tire T from being separated from the center conveyor 22. Therefore, in this embodiment, in the tire removing step (S3), it is possible to suppress bounding of the tire T on the center conveyor 22. Furthermore, in this embodiment, the tire T is detached from the upper rim 33*u* in a state where the tire T is clamped by the center conveyor 22 and the pressing plate 42, and therefore, it is possible to prevent the tire T from deviating in the horizontal direction from the test area Rt.

In this embodiment, an air cylinder is used as the pressing plate moving mechanism 41. However, a linear actuator may be used as the pressing plate moving mechanism 41. However, in a case where the linear actuator is used as the pressing plate moving mechanism 41, it is necessary to control the relative position of a driving end of the linear actuator with respect to a base portion of the linear actuator, and therefore, in order to press a tire that is an elastic body, control of this linear actuator becomes complicated. On the other hand, as in this embodiment, in a case where the air cylinder is used as the pressing plate moving mechanism 41, if air pressure is applied to the inside of the cylinder case 41*c*, the tire T that is an elastic body can be easily and reliably pressed.

The reason for clamping the tire T by the center conveyor 22 and the pressing plate 42 in the clamping step (S2) is mainly for stabilizing the tire T. On the other hand, the reason for relatively moving the upper rim (the first rim) 33*u* vertically upward with respect to the pressing plate (the first support) 42 in the tire removing step (S3) is for detaching the tire T from the upper rim 33*u*. For this reason, it is preferable to make the air pressure in the cylinder case 41*c* during the tire removing step (S3) higher than the air pressure in the cylinder case 41*c* during the clamping step (S2) by the air pressure regulator 43*r*. In this manner, the pressure in the cylinder case 41*c* is regulated, whereby the tire is reliably detached from the upper rim 33*u* in the tire removing step (S3) and during the clamping step (S2), it is possible to suppress large deformation of a part of the tire T due to the pressing plate 42 being strongly pressed against the tire T. As described above, in this embodiment, if the pressure in the cylinder case 41*c* is adjusted, the pressing force to the tire T during the tire removing step (S3) and the pressing force to the tire T during the clamping step (S2) can be easily changed. Therefore, also from such a point of view, it is preferable to use an air cylinder instead of a linear actuator as the pressing plate moving mechanism 41.

Further, in the above embodiment, the distance between the center conveyor 22 and the upper rim 33*u* in the vertical direction is increased by stopping only the rise of the center conveyor 22 in a state where the center conveyor 22 and the upper rim 33*u* are raised. Then, the tire T is detached from the upper rim 33*u* while the distance between the center conveyor 22 and the upper rim 33*u* in the vertical direction is increased. However, the distance between the center conveyor 22 and the upper rim 33*u* in the vertical direction may be increased by raising the upper rim 33*u* before the rise of the center conveyor 22. Then, the tire T may be detached from the upper rim 33*u* while the distance between the center conveyor 22 and the upper rim 33*u* in the vertical direction is increased. That is, the detachment of the tire T from the upper rim 33*u* may be performed before the rise of the center convey 22 is started or may be performed after the rise of the center conveyor 22 is stopped.

Further, in this embodiment, the belt distance changing mechanism (the lower support distance changing mechanism) 24 which changes the distance between the two belts 23 configuring the center conveyor (the lower support) 22 and the stripper distance changing mechanism (the upper support distance changing mechanism) 45 which changes the distance between the two pressing plates (the upper supports) 42 are provided. For this reason, even in a case where the tire size is changed, it is possible to bring the two belts configuring the center conveyor 22 into contact with the lower side wall Twd of the tire T and bring the two pressing plates 42 into contact with the upper side wall Twu of the tire T.

Second Embodiment

A second embodiment of the tire test system according to the present invention will be described with reference to FIGS. 13 to 16.

The hardware configuration of the tire test system of this embodiment is the same as that of the tire test system of the first embodiment. The operation of the tire holding device in the tire removal processing is different between this embodiment and the first embodiment. Specifically, in the tire removal process of the first embodiment, after the tire T is detached from the lower rim 33*d*, the tire T is detached from the upper rim 33*u*. On the other hand, in the tire removal process of this embodiment, after the tire T is detached from the upper rim 33*u*, the tire T is detached from the lower rim 33*d*.

In the first embodiment, the lower rim 33*d* which is first detached from the tire T is the second rim, and the upper rim 33*u* which is detached from the tire T later is the first rim. In this relationship, similar to the lower rim 33*d*, the center conveyor 22 approaching the tire T from below is the second support, and similar to the upper rim 33*u*, the pressing plate 42 approaching the tire T from above is the first support. Further, the conveyor elevating device 25 which moves the center conveyor 22 that is the second support is the second moving mechanism, and the pressing plate moving mechanism 41 which moves the pressing plate 42 that is the first support is the first moving mechanism.

On the other hand, in this embodiment, the upper rim 33*u* which is first detached from the tire T is the second rim, and the lower rim 33*d* which is detached from the tire T later is the first rim. In this relationship, similar to the upper rim 33*u*, the pressing plate 42 approaching the tire T from above is the second support, and similar to the lower rim 33*d*, the center conveyor 22 approaching the tire T from below is the first support. Further, the pressing plate moving mechanism 41 which moves the pressing plate 42 that is the second support is the second moving mechanism, and the conveyor elevating device 25 which moves the center conveyor 22 that is the first support is the first moving mechanism.

Hereinafter, a tire removal processing in this embodiment will be described according to the flowchart shown in FIG. 13.

Figure 15:
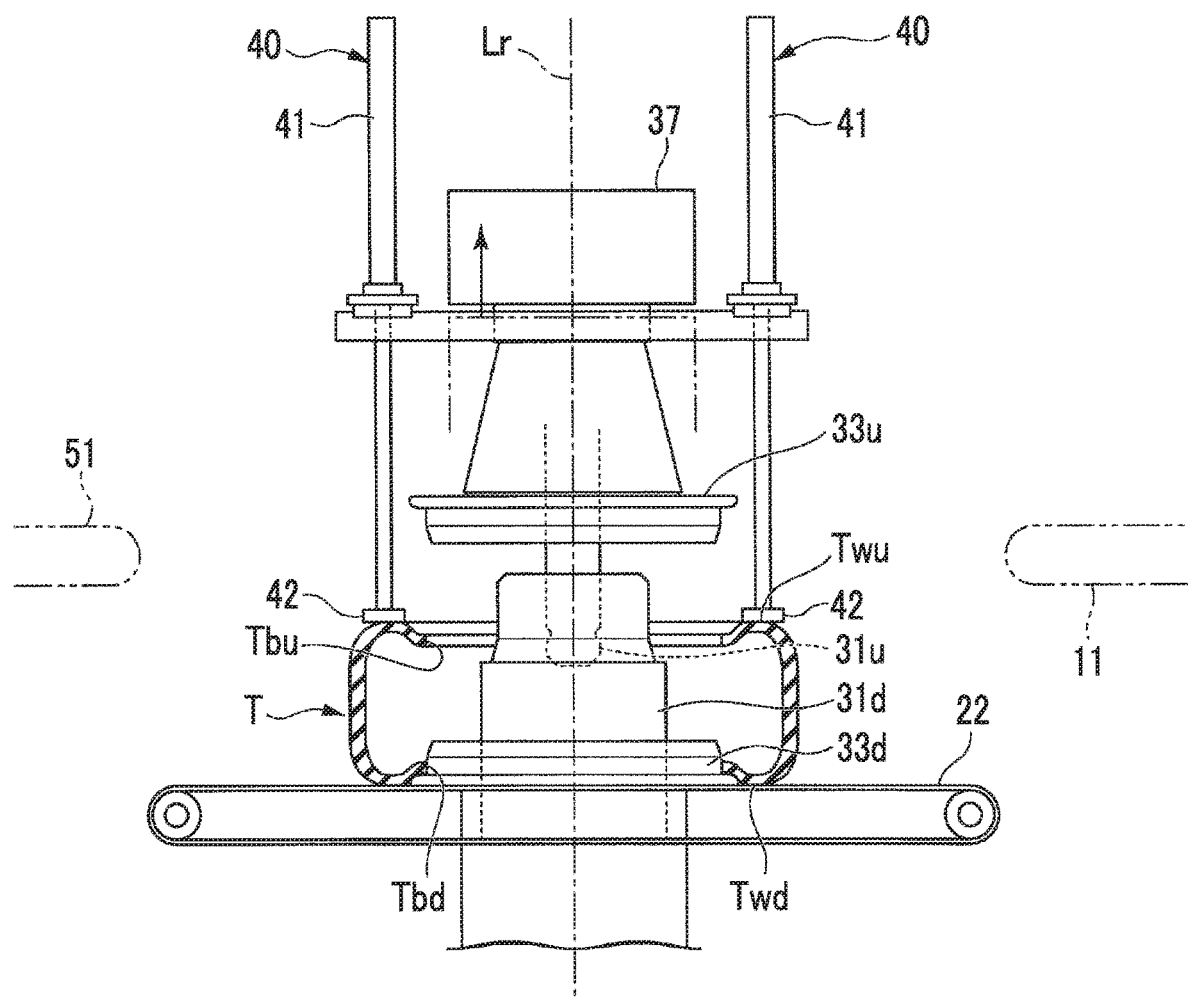
FIG. 15 is an explanatory diagram (Part 2) showing the detaching step and the clamping step in the second embodiment of the present invention.

In this tire removal processing, first, as shown in FIGS. 14 and 15, a detaching step (S1*a*) of detaching the tire T from the upper rim 33*u* is executed. Before the execution of the detaching step (S1*a*), the tire T is held by the upper rim (the second rim) 33*u* and the lower rim (the first rim) 33*d*, as shown in FIG. 9. In the detaching step (S1*a*), first, the conveyor elevating control unit 124 drives the conveyor elevating device (the first moving mechanism) 25 to raise the center conveyor 22 so as to bring the upper surface of the center conveyor 22 into contact with the lower side wall Twd of the tire T, as shown in FIG. 14. Alternatively, the tire T is supported by the center conveyor 22. Further, the stripper drive control unit 125 drives the pressing plate moving mechanism (the second moving mechanism) 41 to lower the pressing plate (the second support) 42 so as to bring the pressing plate 42 into contact with the upper side wall Twu of the tire T.

Thereafter, while the stripper drive control unit 125 continues to drive the pressing plate moving mechanism 41 to press the tire T downward with the pressing plate (the second support) 42, as shown in FIG. 15, the rim movement control unit 123 moves the rim elevator 37 to raise the upper spindle 31*u* and the upper rim (the second rim) 33*u* along with the rim elevator 37. In other words, the tire T is relatively moved in the vertical direction along with the pressing plate (the second support) 42 with respect to the upper rim (the second rim) 33*u*. Only the upper rim (the second rim) 33*u* is raised in a state where the tire T is clamped by the lower rim 33*d* and the center conveyor (the lower support) 22, and the pressing plate (the upper support) 42. Due to the rise of only the upper rim 33*u*, the upper rim 33*u* comes out from the upper bead portion Tbu of the tire T. That is, the tire T is detached from the upper rim (the second rim) 33*u*. As described above, in this embodiment, in a state where the tire T is clamped by the pressing plate (the second support) 42 and the lower rim (the first rim) 33*d*, the tire T is detached from the upper rim (the second rim) 33*u*.

Accordingly, in this embodiment, the tire T can be detached from the upper rim (the second rim) 33*u* in a state where the tire T is stable.

At the point in time when the detaching step (S1*a*) is completed, as shown in FIG. 15, the lower rim (the first rim) 33*d* is still fitted in the lower bead portion Tbd of the tire T, and the pressing plate 42 (the second support) is in a state of being in contact with the upper side wall Twu of the tire T. Further, the center conveyor 22 is in a state of being in contact with the lower side wall Twd of the tire T. Accordingly, at the point in time when the detaching step (S1*a*) is completed, a clamping step (S2*a*) of clamping the tire T by the center conveyor (the first support) 22 and the pressing plate (the second support) 42 has been completed.

In this embodiment, in the detaching step (S1*a*), the center conveyor (the first support) 22 is raised to bring the upper surface of the center conveyor 22 into contact with the lower side wall Twd of the tire T. However, in the detaching step, the upper surface of the center conveyor (the first support) 22 is not brought into contact with the lower side wall Twd of the tire T, and after this detaching step is performed, the tire T may be clamped by the center conveyor (the first support) 22 and the pressing plate (the second support) 42 by bringing the upper surface of the center conveyor 22 into contact with the lower sidewall Twd of the tire T by raising the center conveyor (the first support) 22. That is, after the detaching step is completely completed, the clamping step may be executed.

Figure 16:
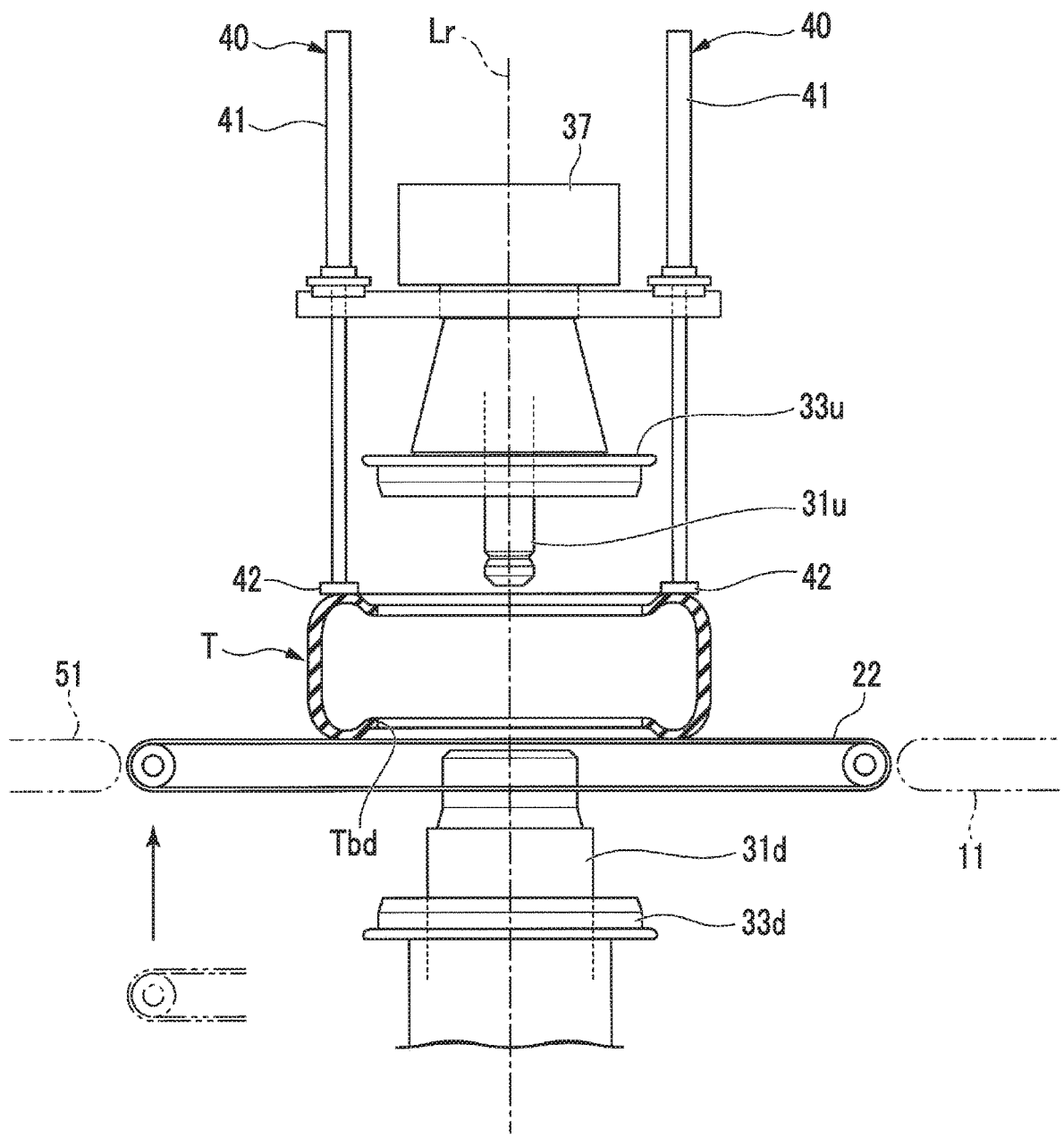
FIG. 16 is an explanatory diagram showing a tire removing step in the second embodiment of the present invention.

Next, as shown in FIG. 16, a tire removing step (S3*a*) of detaching the tire T from the lower rim 33*d* by relatively moving the center conveyor (the first support) 22 vertically upward with respect to the lower rim (the first rim) 33*d* while maintaining a state where the tire T is clamped by the pressing plate (the upper support) 42 and the center conveyor (the lower support) 22 is executed. In the tire removing step (S3*a*), the conveyor elevating control unit 124 drives the conveyor elevating device 25 to raise the center conveyor 22 to the upper limit position. During this time, the pressing plate 42 maintains a state of pressing the tire T downward. For this reason, the center conveyor (the first support) 22 relatively moves vertically upward with respect to the lower rim (the first rim) 33*d*. Due to the rise of the center conveyor 22, the lower rim 33*d* comes out from the lower bead portion Tbd of the tire T. That is, the tire T is detached from the lower rim (the first rim) 33*d*. With the above, the tire removing step (S3*a*) is completed. Also in this embodiment, similar to the first embodiment, it is preferable to make the air pressure in the cylinder case 41*c* during the tire removing step (S3*a*) higher than the air pressure in the cylinder case 41*c* during the clamping step (S2*a*) by the air pressure regulator 43*r*.

With the completion of the tire removing step (S3*a*), the tire removal processing of removing the tire T from the upper spindle 31*u* and the lower spindle 31*d* is ended.

As described above, in this embodiment, in a state where the tire T is clamped by the center conveyor 22 and the pressing plate 42, the tire T is detached from the lower rim 33*d* (S3*a*: tire removing step). For this reason, it is possible to prevent the tire T from departing from the center conveyor 22 in the process of detaching the tire T from the lower rim 33*d*. Therefore, also in this embodiment, similar to the first embodiment, in the tire removing step (S3*a*), it is possible to suppress bounding of the tire T on the center conveyor 22. Furthermore, also in this embodiment, the tire T is detached from the lower rim 33*d* in a state where the tire T is clamped by the center conveyor 22 and the pressing plate 42, and therefore, it is possible to prevent the tire T from deviating in the horizontal direction from the test area Rt.

Also in this embodiment, similar to the first embodiment, an air cylinder is used as the pressing plate moving mechanism 41. For this reason, also in this embodiment, the control of the pressing plate moving mechanism 41 becomes easy.

Modification Example

The present invention is not limited to each of the embodiments described above and includes various modifications added to the above-described embodiments within a scope which does not depart from the gist of the present invention. That is, the specific shapes, configurations, or the like described in each embodiment are merely examples and can be appropriately changed.

The upper support in the embodiments described above is a plate-shaped pressing plate 42. However, the upper support may not be in the form of a plate and may be columnar or spherical, for example. It is preferable that the upper support suppresses the local deformation of the tire T as much as possible while maintaining the frictional force with the upper side wall Twu of the tire T and the pressing force pressing the tire T. To this end, it is preferable that the upper support is in the form of a plate capable of increasing the contact area with the upper side wall Twu of the tire T.

The stripper distance changing mechanism (the upper support distance changing mechanism) 45 in the embodiments described above moves the tire stripper 40 in the horizontal direction and in a direction parallel to the path center line Lc. However, the stripper distance changing mechanism 45 may move the tire stripper 40 in the horizontal direction and in a direction twisted with respect to the path center line Lc.

In each of the embodiments described above, the center conveyor 22 is moved relative to the lower rim 33*d* by lowering the center conveyor 22. However, the center conveyor 22 may be moved relative to the lower rim 33*d* by raising to the lower rim 33*d*, for example.

INDUSTRIAL APPLICABILITY

According to an aspect of the present invention, when the tire is removed from the upper rim or the lower rim, it is possible to suppress the bounding of the tire and suppress the movement of the tire in the horizontal direction.

REFERENCE SIGNS LIST

10: pre-treatment device
11: inlet conveyor
12: centering mechanism
20: test device
21: frame
21*a*: base
21*b*: main frame
22: center conveyor (lower support)
23: belt
24: belt distance changing mechanism (lower support distance changing mechanism)
25: conveyor elevating device (lower support moving mechanism)
25*a*: guide means
29: bracket
30, 30*a*: tire holding device
31*u*: upper spindle
31*d*: lower spindle
32*u*: upper rim chuck mechanism
32*d*: lower rim chuck mechanism
33*u*: upper rim
33*d*: lower rim
37: rim elevator (rim elevating mechanism)
39: tire measuring instrument
40: tire stripper
40*u*: first tire stripper
40*d*: second tire stripper
41: pressing plate moving mechanism (upper support moving mechanism)
41*c*: cylinder case
41*r*: piston rod
41*p*: piston
42: pressing plate (upper support)
43*a*: air supply source
4311: first air line
4312: second air line
431*s*: air supply line
43*r*: air pressure regulator
43*v*: switching valve
45: stripper distance changing mechanism (upper support distance changing mechanism)
46: screw shaft
46*r*: rail
46*g*: guide
47: nut member
48*b*: bearing
48*m*: motor
49*a*: distance changing mechanism base
49*b*: cylinder mounting plate
50: post-treatment device
51: outlet conveyor
100: controller
110: pre-treatment control unit
120: test control unit
121: spindle rotation control unit
122: center conveyor control unit
123: rim movement control unit
124: conveyor elevating control unit
125: stripper drive control unit
126: belt distance control unit
127: stripper distance control unit
128: measurement control unit
130: post-treatment control unit
T: tire
Tbu: upper bead portion
Tbd: lower bead portion
Twu: upper side wall
Twd: lower side wall
Lc: path center line
Rt: test area
Lr: axis of rotation
X: tire conveying direction
(−)X: upstream side
(+)X: downstream side
Y: path width direction

The invention claimed is:

1. A tire holding device comprising:
an upper rim which is fitted in an upper bead portion of a tire that is in a state where both side walls thereof face a vertical direction;
a lower rim which is disposed below the upper rim and fitted in a lower bead portion of the tire to hold the tire along with the upper rim;

an upper support capable of coming into contact with an upper side wall of the tire;

a lower support which comes into contact with a lower side wall of the tire to support the tire;

a lower support moving mechanism which relatively moves the lower support in the vertical direction with respective to the lower rim; and a controller which controls an operation of the lower support moving mechanism, wherein the controller executes a clamping step of clamping the tire by the lower support and the upper support by bringing the lower support into contact with the lower side wall of the tire in a state where the upper rim is separated from the upper bead portion of the tire, the lower rim is fitted in the lower bead portion of the tire, and the upper support is in contact with the upper side wall of the tire, and a tire removing step of detaching the tire from the lower rim by relatively moving the lower rim vertically downward with respect to the lower support by driving the lower support moving mechanism while maintaining a state where the tire is clamped by the lower support and the upper support.

2. The tire holding device according to claim 1, further comprising:

a tire stripper which includes the upper support and an upper support moving mechanism which relatively moves the upper support in the vertical direction with respect to the upper rim, wherein the controller executes, before at least the tire removing step, a detaching step of detaching the tire from the upper rim by bringing the upper support into contact with the upper side wall of the tire by relatively moving the upper support vertically downward with respect to the upper rim by driving the tire stripper in a state where the tire is held by the upper rim and the lower rim, and relatively moving the tire along with the upper support vertically downward with respect to the upper rim.

3. The tire holding device according to claim 2, wherein the upper support moving mechanism is an air cylinder, and the air cylinder includes a piston rod extending in the vertical direction and a cylinder case in which a first end of the piston rod is accommodated and which advances and retreats the piston rod with air pressure in the vertical direction, and the upper support is fixed to a second end of the piston rod.

4. The tire holding device according to claim 3, further comprising:

an air pressure regulator which regulates air pressure in the cylinder case, wherein the controller makes the air pressure in the cylinder case during the clamping step lower than the air pressure in the cylinder case during the tire removing step by the air pressure regulator.

5. The tire holding device according to claim 1, wherein both the upper rim and the lower rim are disposed to be centered on an axis extending in the vertical direction, the upper support includes a first upper support and a second upper support spaced apart from each other in a radial direction with respect to the axis, the lower support includes a first lower support and a second lower support spaced apart from each other in a radial direction with respect to the axis, and the tire holding device further comprises an upper support distance changing mechanism which changes a distance between the first upper support and the second upper support in the radial direction, and a lower support distance changing mechanism which changes a distance between the first lower support and the second lower support in the radial direction.

6. The tire holding device according to claim 1, wherein the lower support is a conveyor on which the tire that is in a state where both side walls thereof face the vertical direction is placed and which conveys the tire in a horizontal direction.

7. A tire test system comprising:

the tire holding device according to claim 1; and a tire measuring instrument which performs various measurements on the tire held by the upper rim and the lower rim.

8. A tire holding device comprising:

an upper rim which is fitted in an upper bead portion of a tire that is in a state where both side walls thereof face a vertical direction;

a lower rim which is disposed below the upper rim and fitted in a lower bead portion of the tire to hold the tire along with the upper rim;

a rim elevating mechanism which relatively moves the upper rim in the vertical direction with respect to the lower rim;

a lower support which comes into contact with a lower side wall of the tire to support the tire;

a tire stripper which includes an upper support capable of coming into contact with an upper side wall of the tire, and an upper support moving mechanism which relatively moves the upper support in the vertical direction with respect to the upper rim; and a controller which controls an operation of each of the rim elevating mechanism and the tire stripper, wherein the controller executes a clamping step of clamping the tire by the lower support and the upper support by bringing the upper support into contact with the upper side wall of the tire by driving the tire stripper in a state where the lower rim is separated from the lower bead portion of the tire, the upper rim is fitted in the upper bead portion of the tire, and the lower support is in contact with the lower side wall of the tire, and a tire removing step of detaching the tire from the upper rim by relatively moving the upper rim vertically upward with respect to the upper support by driving the rim elevating mechanism while maintaining a state where the tire is clamped by the lower support and the upper support.

9. The tire holding device according to claim 8, further comprising:

a lower support moving mechanism which relatively moves the lower support in the vertical direction with respect to the lower rim, wherein the controller executes, before at least the tire removing step, a detaching step of detaching the tire from the lower rim by bringing the lower support into contact with the lower side wall of the tire by relatively moving the lower support vertically upward with respect to the lower rim by driving the lower support moving mechanism in a state where the tire is held by the upper rim and the lower rim, and relatively moving the tire along with the lower support vertically upward with respect to the lower rim.

10. A control method for a tire holding device which includes
- an upper rim which is fitted in an upper bead portion of a tire that is in a state where both side walls thereof face a vertical direction,
- a lower rim which is disposed below the upper rim and fitted in a lower bead portion of the tire to hold the tire along with the upper rim,
- an upper support capable of coming into contact with an upper side wall of the tire,
- a lower support which comes into contact with a lower side wall of the tire to support the tire, and
- a lower support moving mechanism which relatively moves the lower support in the vertical direction with respect to the lower rim, the control method comprising:
- a clamping step of clamping the tire by the lower support and the upper support by bringing the lower support into contact with the lower side wall of the tire in a state where the upper rim is separated from the upper bead portion of the tire, the lower rim is fitted in the lower bead portion of the tire, and the upper support is in contact with the upper side wall of the tire; and
- a tire removing step of detaching the tire from the lower rim by relatively moving the lower rim vertically downward with respect to the lower support by driving the lower support moving mechanism while maintaining a state where the tire is clamped by the lower support and the upper support.

11. The control method for a tire holding device according to claim 10,
- wherein the tire holding device further includes a tire stripper which includes the upper support and an upper support moving mechanism which relatively moves the upper support in the vertical direction with respect to the upper rim, and
- a detaching step of detaching the tire from the upper rim by bringing the upper support into contact with the upper side wall of the tire by relatively moving the upper support vertically downward with respect to the upper rim by driving the tire stripper in a state where the tire is held by the upper rim and the lower rim, and relatively moving the tire along with the upper support vertically downward with respect to the upper rim is executed before at least the tire removing step.

12. A control method for a tire holding device which includes
- an upper rim which is fitted in an upper bead portion of a tire that is in a state where both side walls thereof face a vertical direction,
- a lower rim which is disposed below the upper rim and fitted in a lower bead portion of the tire to hold the tire along with the upper rim,
- a rim elevating mechanism which relatively moves the upper rim in the vertical direction with respect to the lower rim,
- a lower support which comes into contact with a lower side wall of the tire to support the tire, and
- a tire stripper which includes an upper support capable of coming into contact with an upper side wall of the tire and an upper support moving mechanism which relatively moves the upper support in the vertical direction with respect to the upper rim, the control method comprising:
- a clamping step of clamping the tire by the upper support and the lower support by bringing the upper support into contact with the upper side wall of the tire by driving the tire stripper in a state where the lower rim is separated from the lower bead portion of the tire, the upper rim is fitted in the upper bead portion of the tire, and the lower support is in contact with the lower side wall of the tire; and
- a tire removing step of detaching the tire from the upper rim by relatively moving the upper rim vertically upward with respect to the upper support by driving the rim elevating mechanism while maintaining a state where the tire is clamped by the lower support and the upper support.

13. The control method for a tire holding device according to claim 12,
- wherein the tire holding device further includes a lower support moving mechanism which relatively moves the lower support in the vertical direction with respect to the lower rim, and
- a detaching step of detaching the tire from the lower rim by bringing the lower support into contact with the lower side wall of the tire by relatively moving the lower support vertically upward with respect to the lower rim by driving the lower support moving mechanism in a state where the tire is held by the upper rim and the lower rim, and relatively moving the tire along with the lower support vertically upward with respect to the lower rim is executed before at least the tire removing step.

* * * * *